United States Patent
Sato et al.

(10) Patent No.: US 9,898,747 B2
(45) Date of Patent: Feb. 20, 2018

(54) INFORMATION PROCESSING SYSTEM PERFORMING SYNCHRONIZATION BETWEEN MEMORY DEVICES AND MEMORY DEVICES PERFORMING WIRELESS COMMUNICATION

(71) Applicant: Toshiba Memory Corporation, Minato-ku (JP)

(72) Inventors: Keisuke Sato, Yokohama (JP); Masaomi Teranishi, Yokohama (JP); Shuichi Sakurai, Yokohama (JP); Masahiko Nakashima, Kawasaki (JP); Shigeki Koizumi, Yokohama (JP); Michio Ido, Yokohama (JP); Shigeto Endo, Kamakura (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/203,977

(22) Filed: Jul. 7, 2016

(65) Prior Publication Data
US 2017/0010811 A1  Jan. 12, 2017

(30) Foreign Application Priority Data
Jul. 9, 2015 (JP) .................................. 2015-138005

(51) Int. Cl.
*G06K 19/00* (2006.01)
*G06Q 30/02* (2012.01)
(Continued)

(52) U.S. Cl.
CPC ............. *G06Q 30/02* (2013.01); *G06F 3/061* (2013.01); *G06F 3/0655* (2013.01);
(Continued)

(58) Field of Classification Search
CPC ......... G06K 19/07769; G06K 19/0723; G06K 7/10297; G06K 7/10316; G06K 19/07732;
(Continued)

(56) References Cited

U.S. PATENT DOCUMENTS 9,342,718 B2 * 5/2016 Sato .................. G06K 7/10316
2007/0241187 A1 10/2007 Alderucci et al.
(Continued)

FOREIGN PATENT DOCUMENTS

JP  4-323980  11/1992
JP  2002-374244  12/2002
(Continued)

*Primary Examiner* — Hong Kim
(74) *Attorney, Agent, or Firm* — Oblon, McClelland, Maier & Neustadt, L.L.P.

(57) ABSTRACT

According to one embodiment, a memory device includes a nonvolatile memory, a first controller which controls the nonvolatile memory, a wireless antenna, a memory, a second controller, and a third controller. The wireless antenna generates electric power based on a radio wave from a first external device. The memory is operable based on the generated electric power. The second controller is operable based on the generated electric power and controls communication using the wireless antenna. The third controller controls data copy or transfer between the nonvolatile memory and the memory. The third controller receives, from a second external device, identification information and stores the identification information in the memory. The second controller transmits login information and identification information stored in the memory to the first external device via the wireless antenna.

20 Claims, 27 Drawing Sheets

(51) Int. Cl.
*G06K 19/077* (2006.01)
*G06K 7/10* (2006.01)
*H04B 5/00* (2006.01)
*G06F 3/06* (2006.01)
*G06K 19/07* (2006.01)

(52) U.S. Cl.
CPC ....... *G06F 3/0688* (2013.01); *G06K 7/10297* (2013.01); *G06K 7/10316* (2013.01); *G06K 19/0723* (2013.01); *G06K 19/07732* (2013.01); *G06K 19/07769* (2013.01); *H04B 5/0037* (2013.01)

(58) Field of Classification Search
CPC ..... H04B 5/0037; G06F 3/061; G06F 3/0688; G06F 3/0655
USPC ....... 455/41.2, 522; 711/154, 103, 104, 115; 718/101; 726/19; 710/11, 10, 13; 380/270; 235/492; 320/108
See application file for complete search history.

(56) References Cited

U.S. PATENT DOCUMENTS

| | | | |
|---|---|---|---|
| 2007/0257101 A1 | 11/2007 | Alderucci et al. | |
| 2009/0239468 A1* | 9/2009 | He | H04L 63/0853 455/41.2 |
| 2013/0020395 A1* | 1/2013 | Sato | G06K 19/07769 235/492 |
| 2013/0268720 A1* | 10/2013 | Ito | H04L 67/1097 711/103 |
| 2014/0351543 A1* | 11/2014 | Tan | G06F 21/604 711/163 |
| 2015/0199546 A1* | 7/2015 | Sato | G06K 7/10316 340/10.51 |
| 2015/0244200 A1* | 8/2015 | Juan | H02J 7/0052 320/108 |
| 2015/0244422 A1* | 8/2015 | Ohashi | H04B 5/0081 455/41.1 |
| 2016/0216889 A1* | 7/2016 | Sato | G06K 7/10316 |
| 2016/0227014 A1* | 8/2016 | Takagi | H04M 1/7253 |
| 2016/0321011 A1* | 11/2016 | Sato | G06F 3/0659 |
| 2017/0097791 A1* | 4/2017 | Sato | G06F 3/061 |
| 2017/0099646 A1* | 4/2017 | Ido | H04W 60/04 |
| 2017/0163846 A1* | 6/2017 | Ichikawa | H04N 1/32795 |

FOREIGN PATENT DOCUMENTS

| | | |
|---|---|---|
| JP | 4339020 | 10/2009 |
| JP | 4449348 | 4/2010 |
| JP | 2012-8611 | 1/2012 |
| JP | 4986264 | 7/2012 |
| JP | 5596342 | 9/2014 |

* cited by examiner

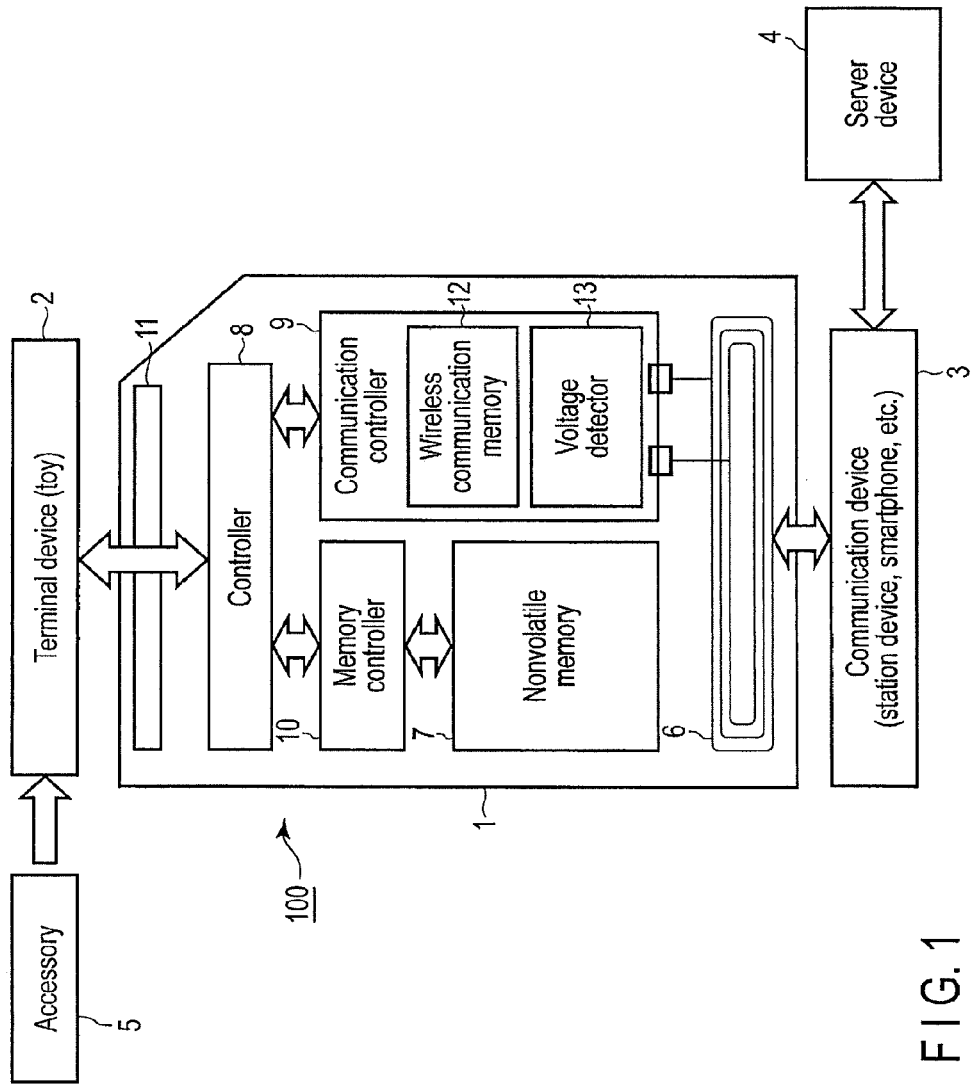
F I G. 1

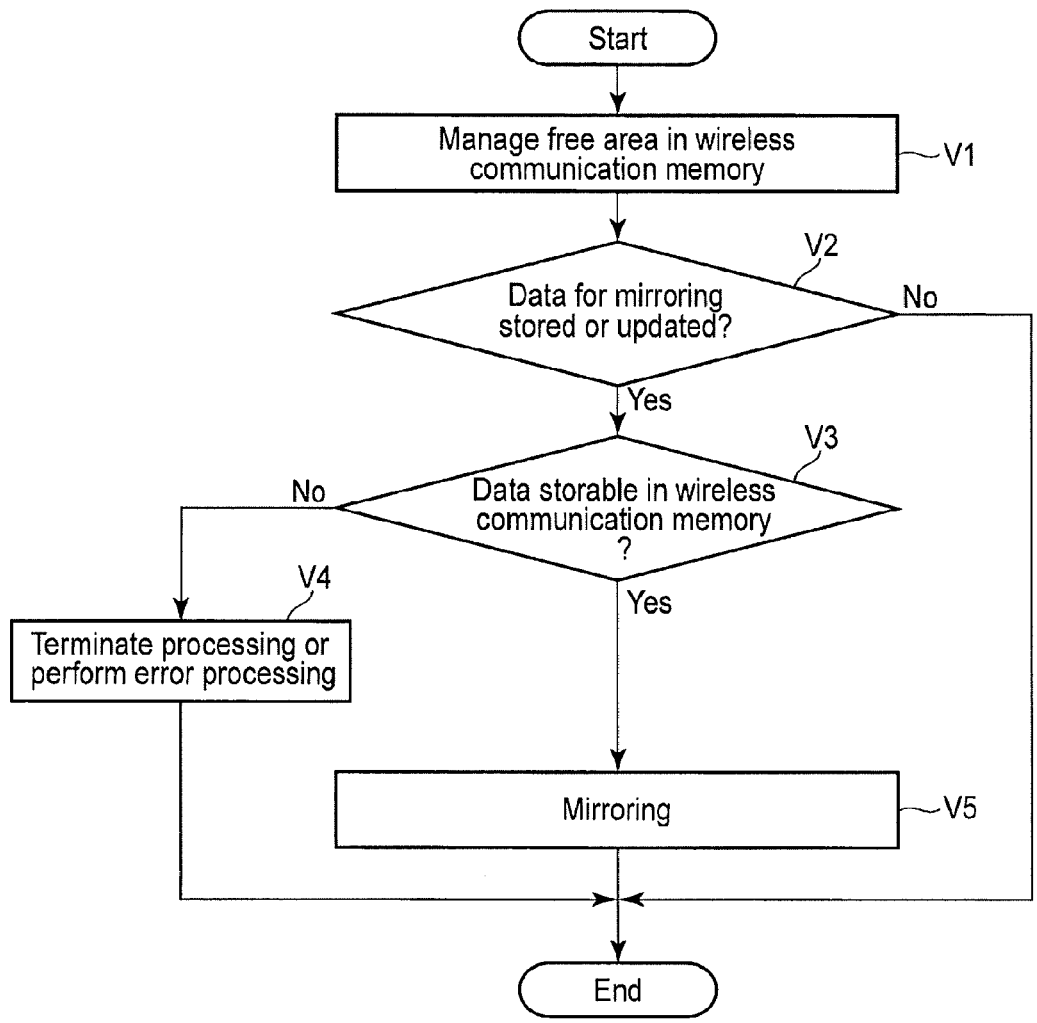
F I G. 3

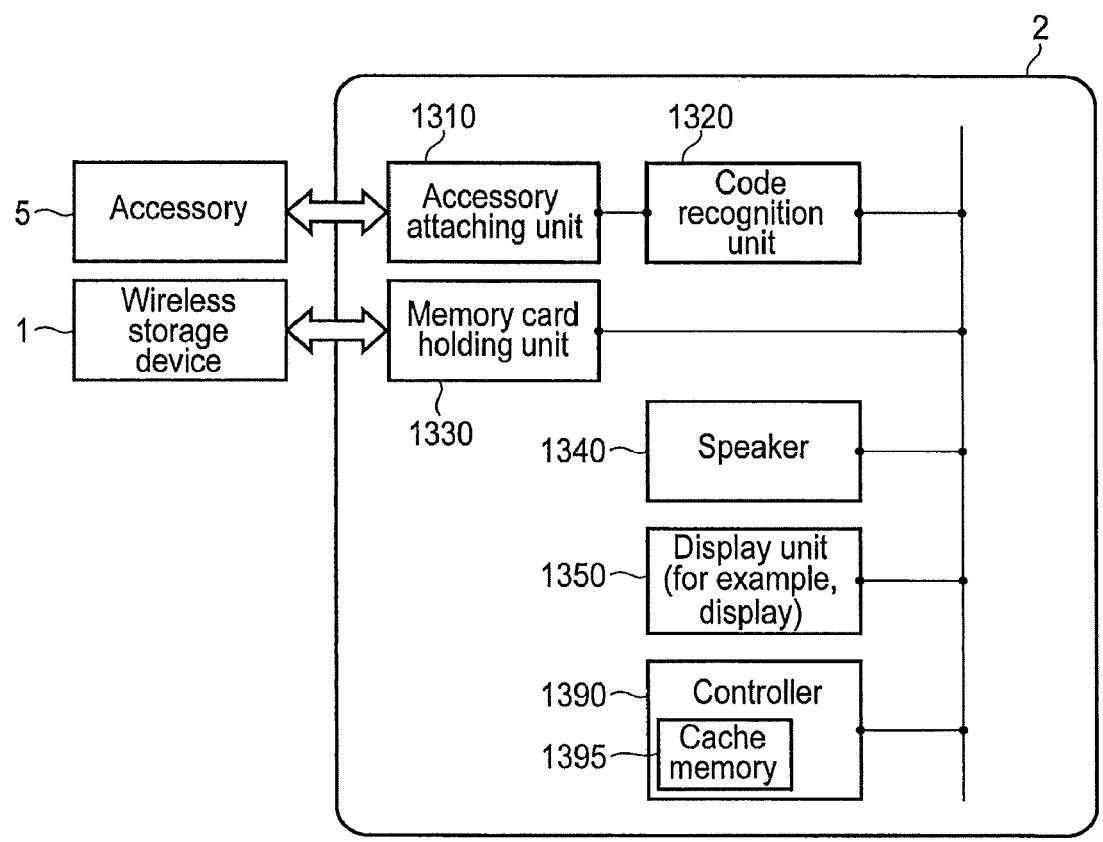
F I G. 4

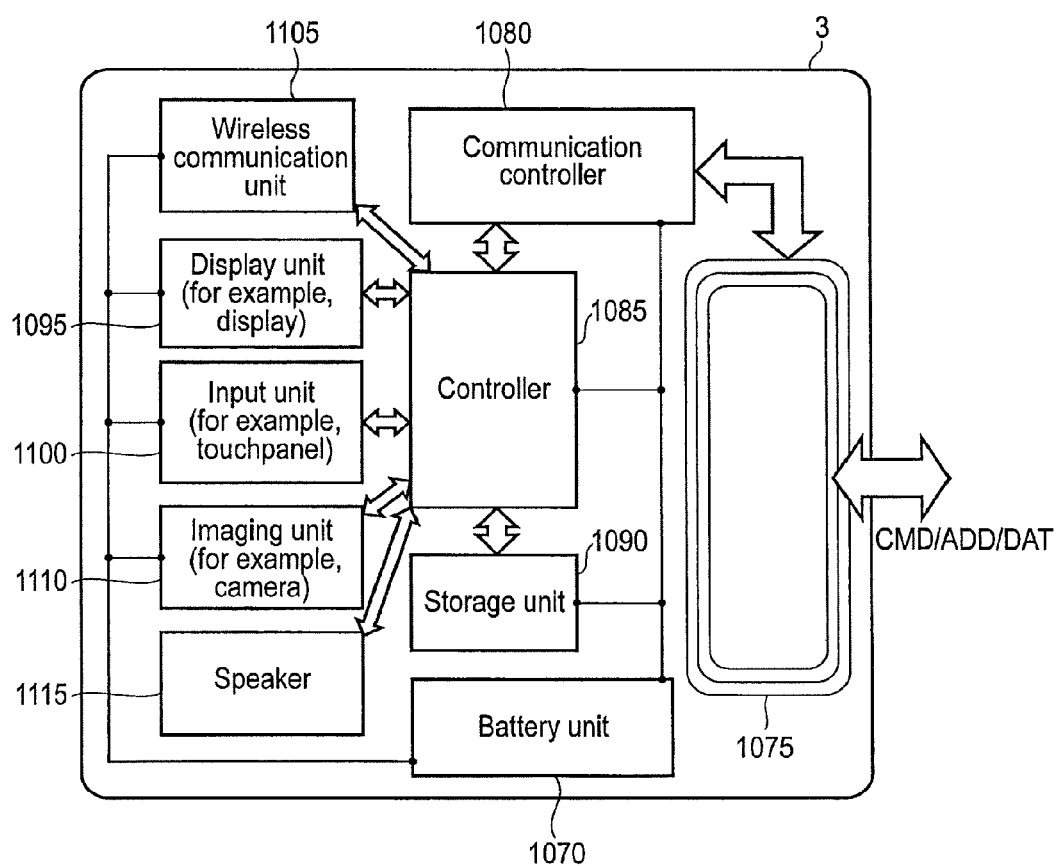
F I G. 5

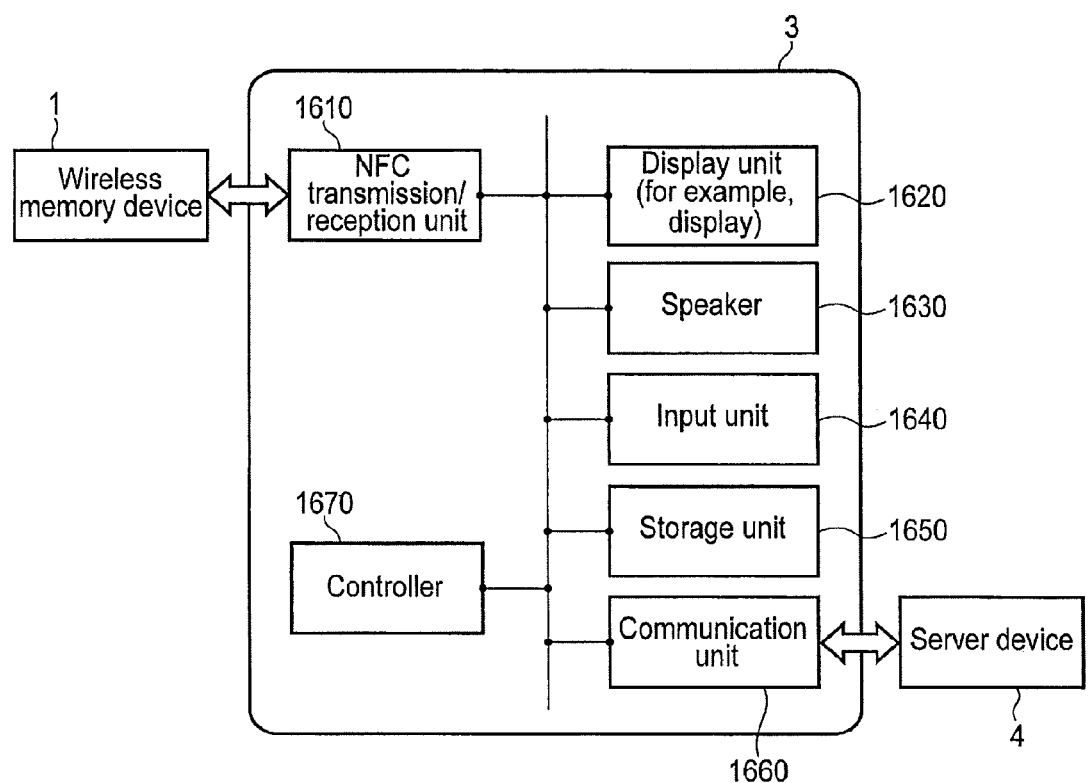
F I G. 6
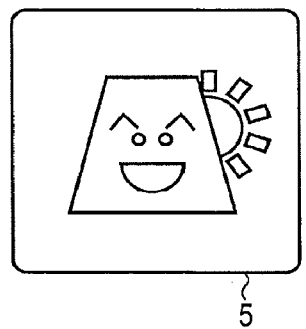
F I G. 7A
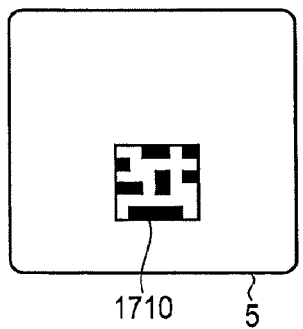
F I G. 7B

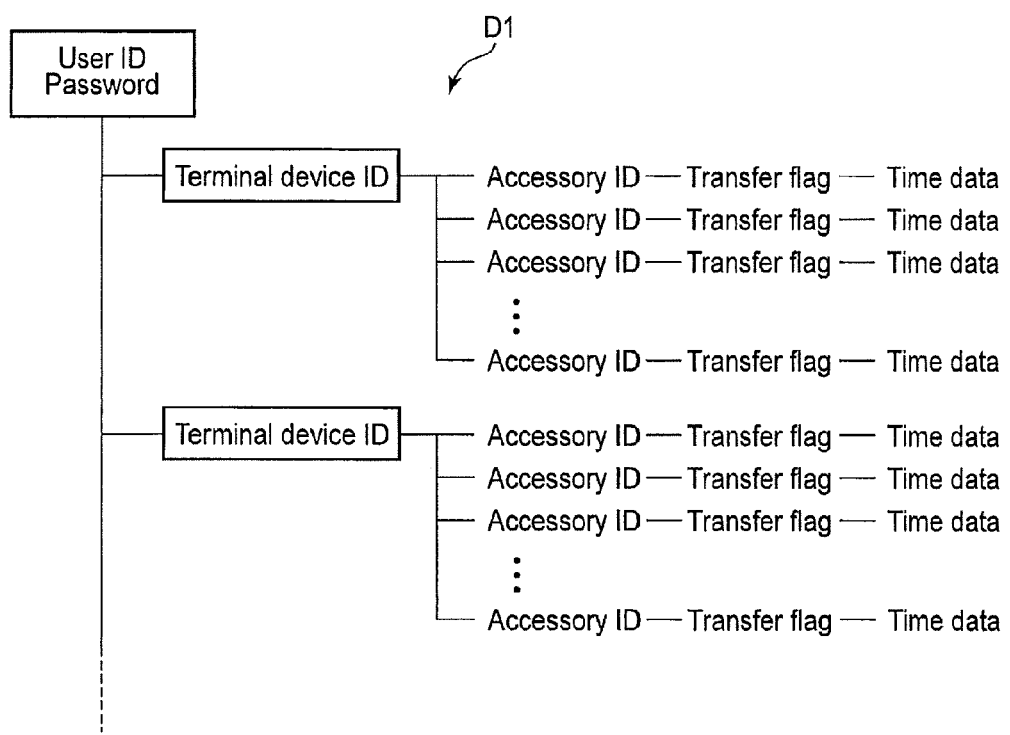
F I G. 8

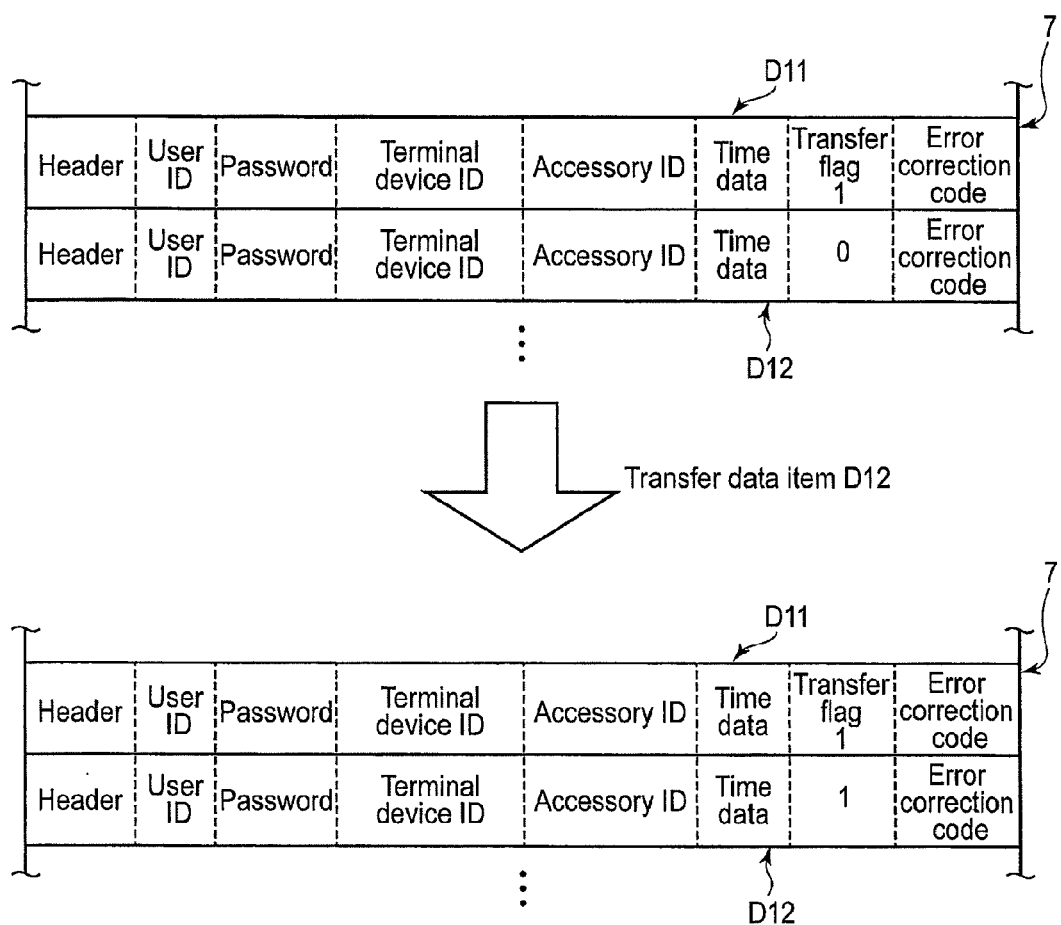
F I G. 15

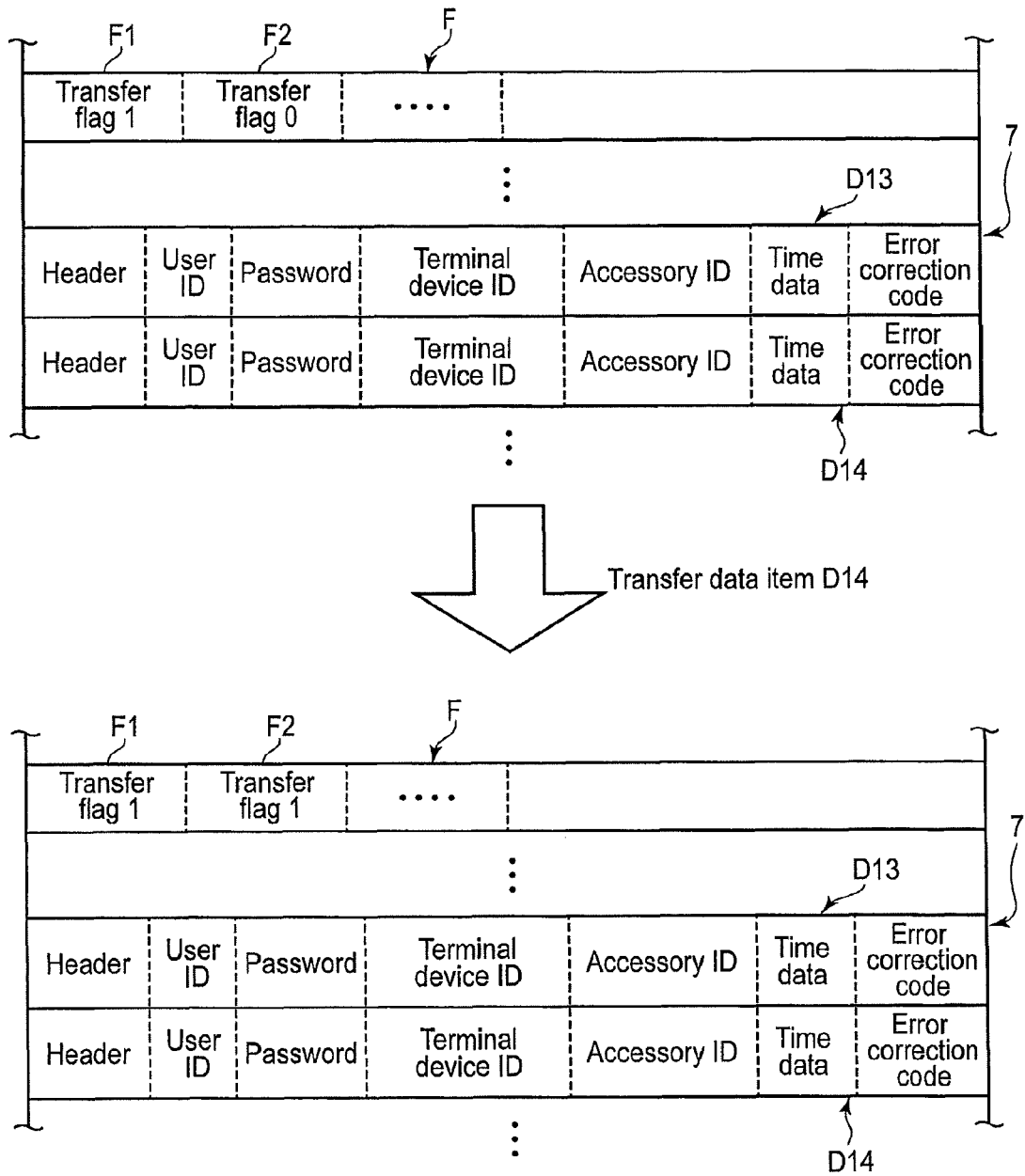
F I G. 16

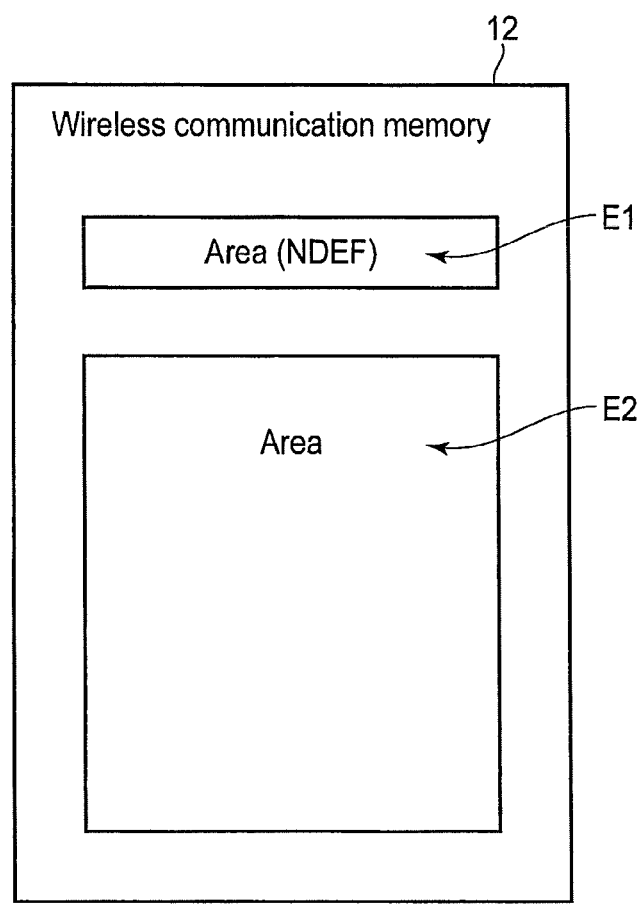
F I G. 17

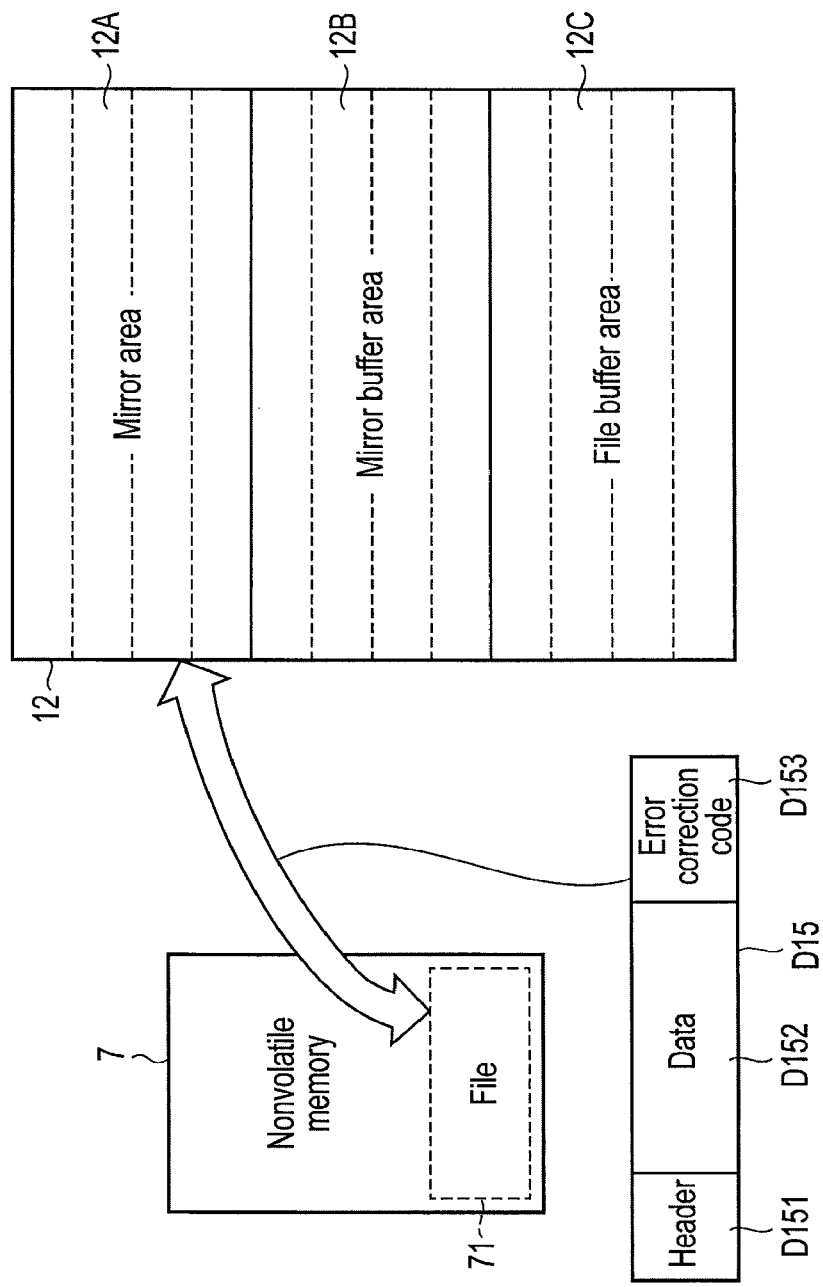
F I G. 18

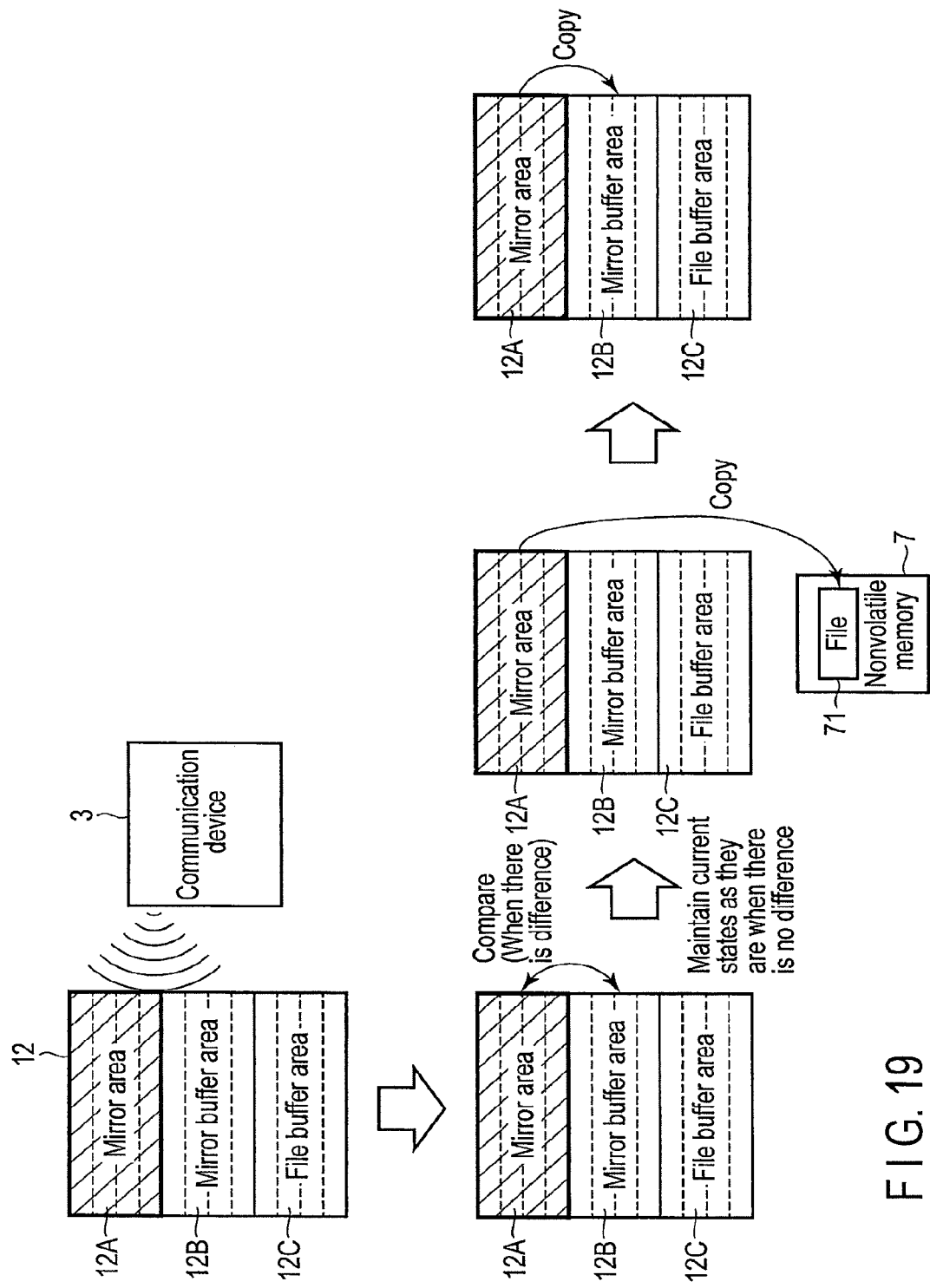
F I G. 19

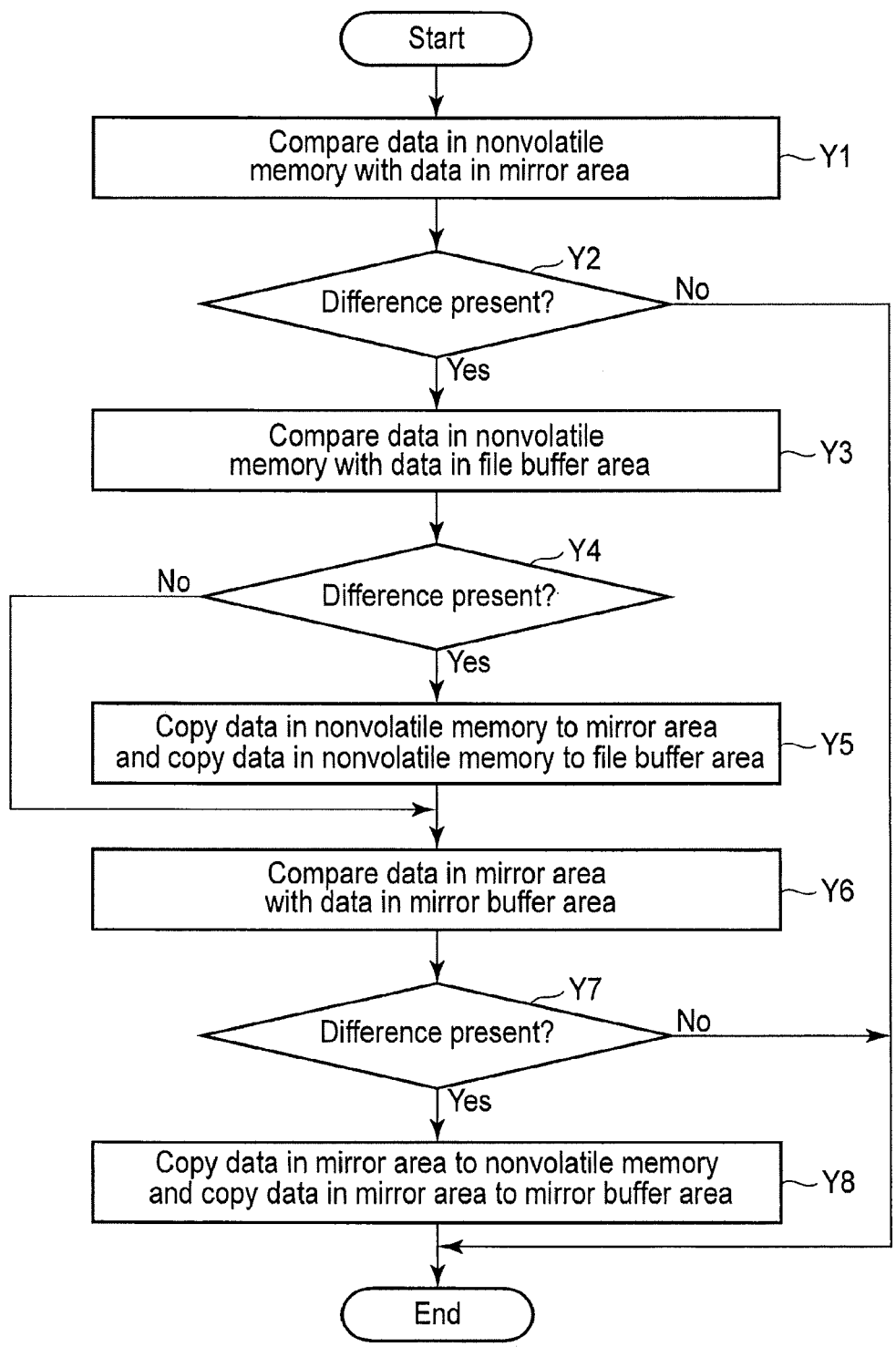
F I G. 21

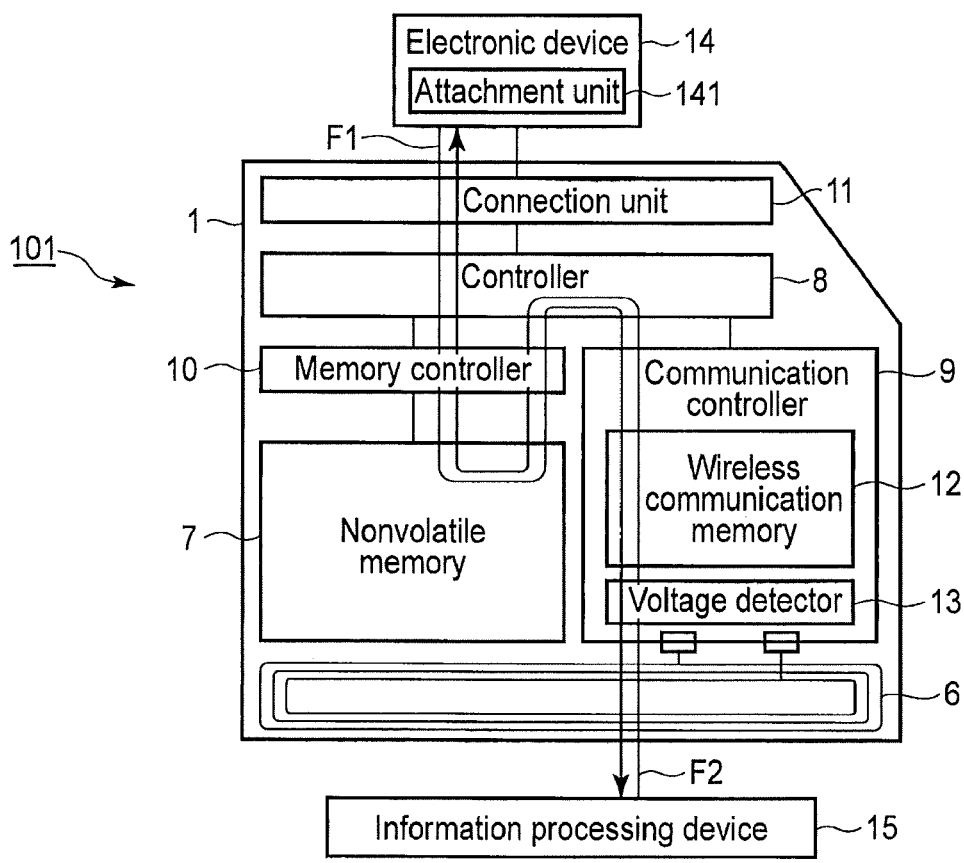
F I G. 22

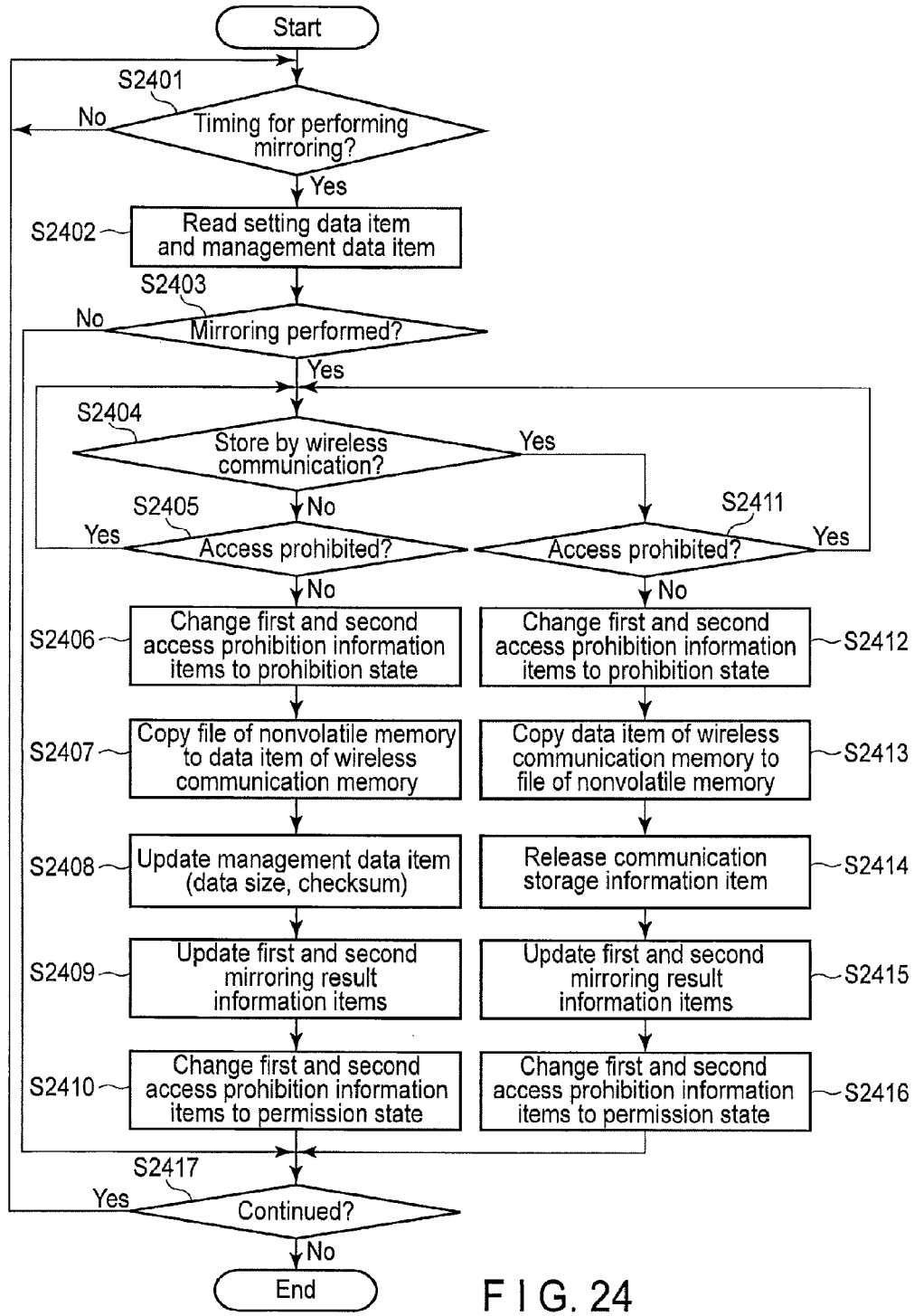
F I G. 24

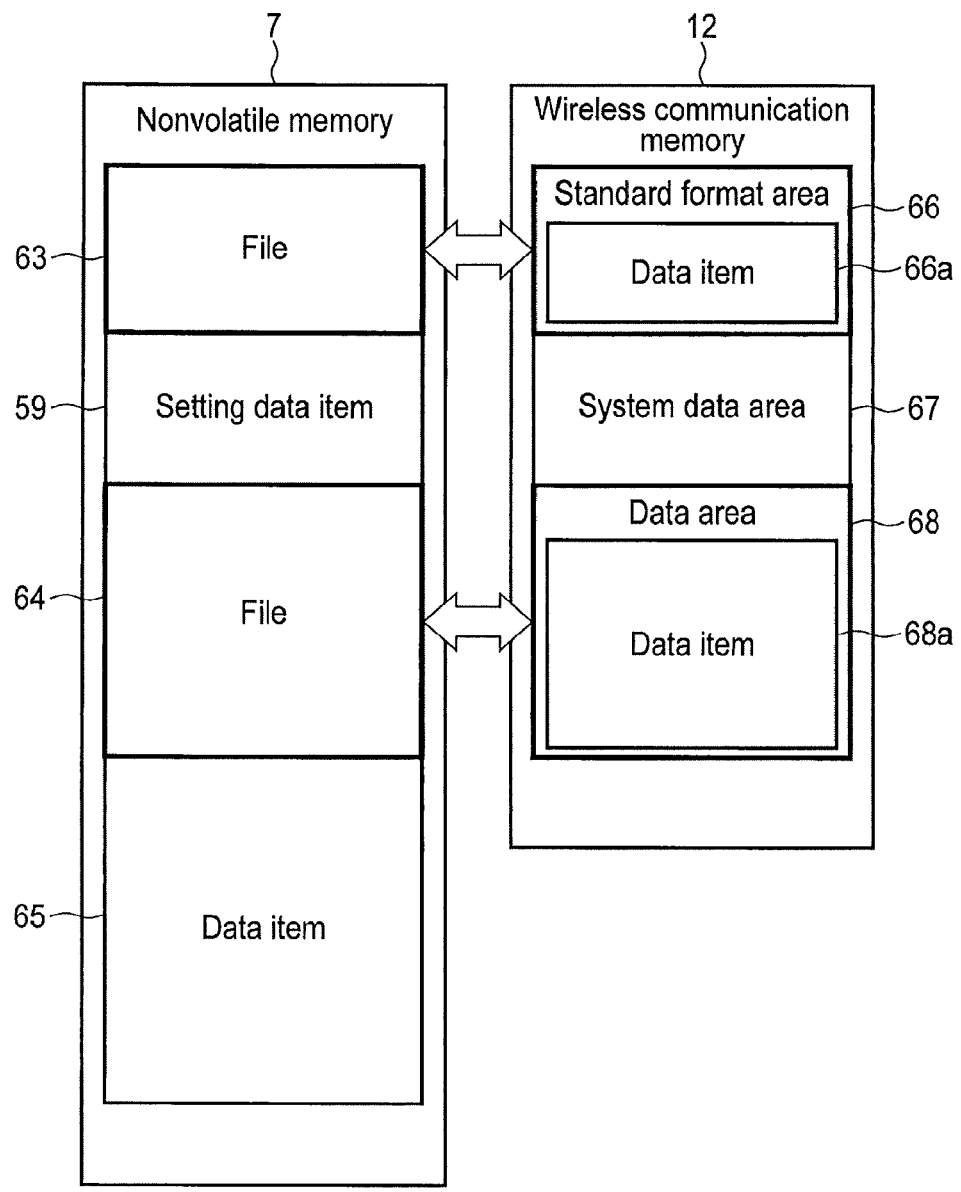
F I G. 25

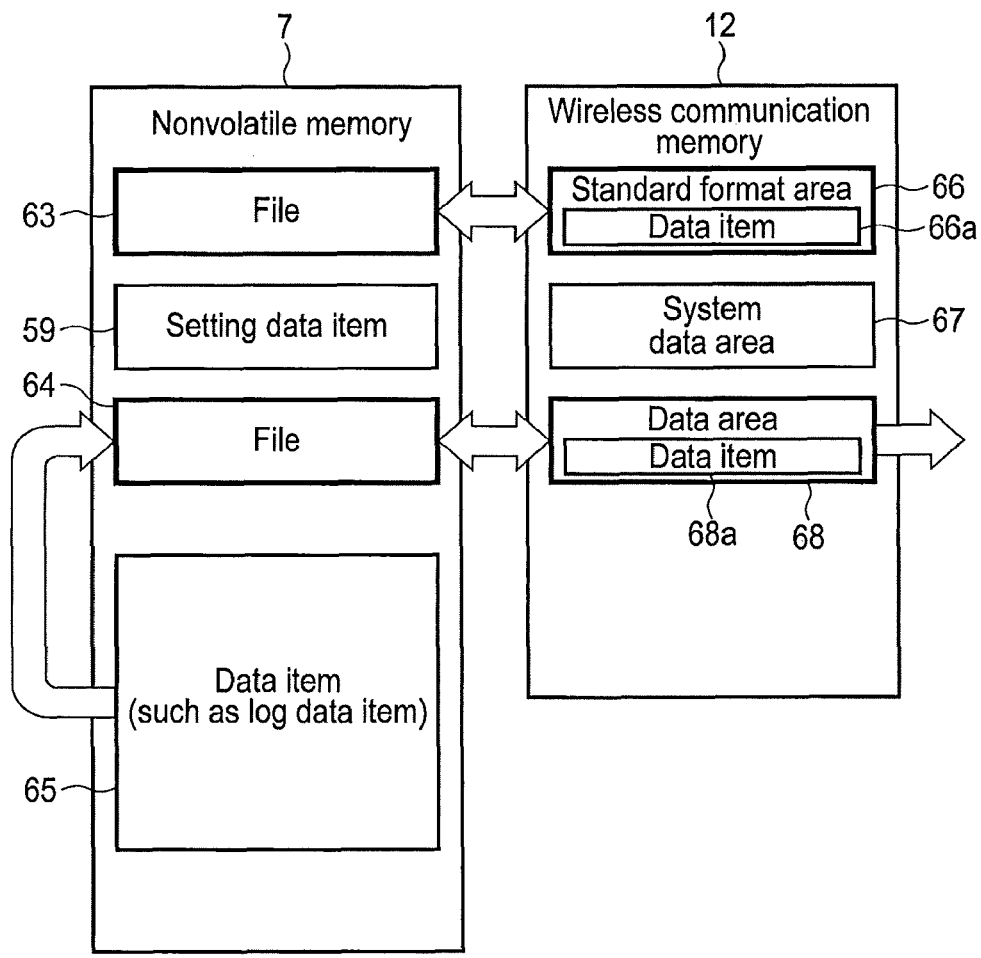
F I G. 26

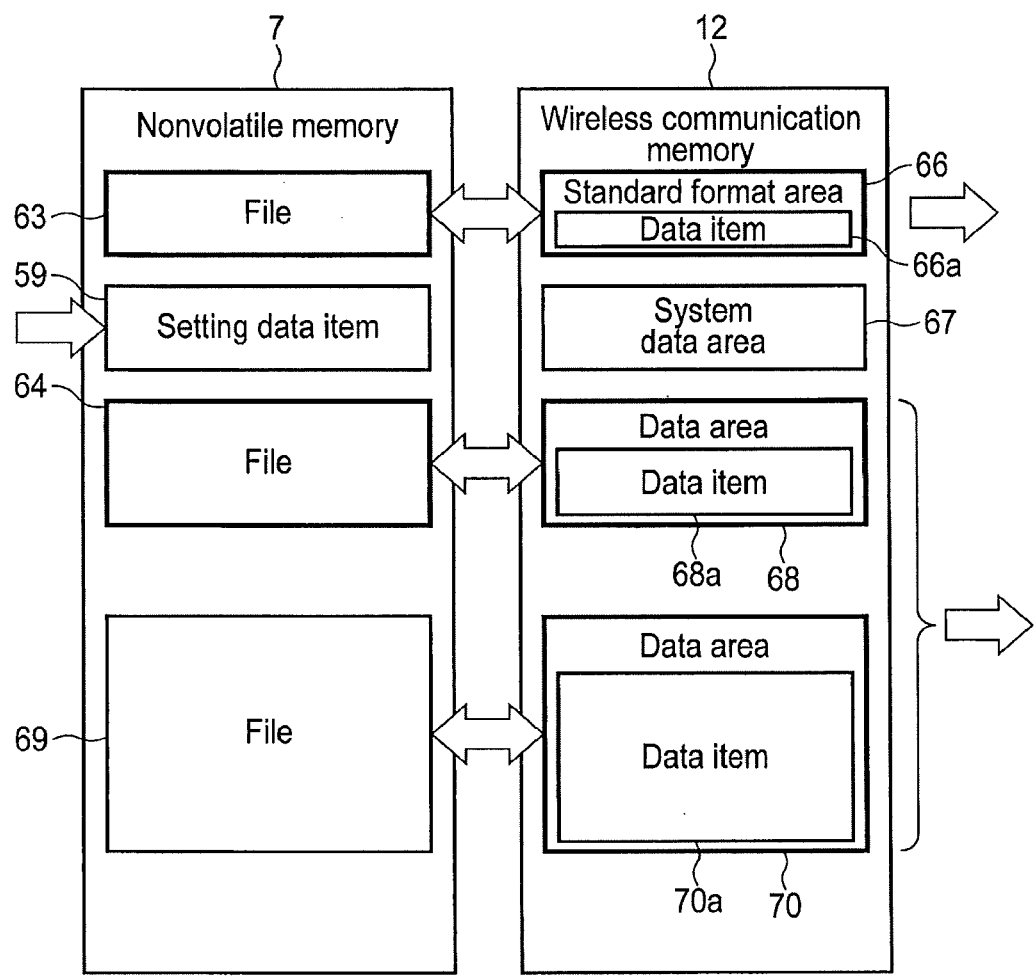
F I G. 27

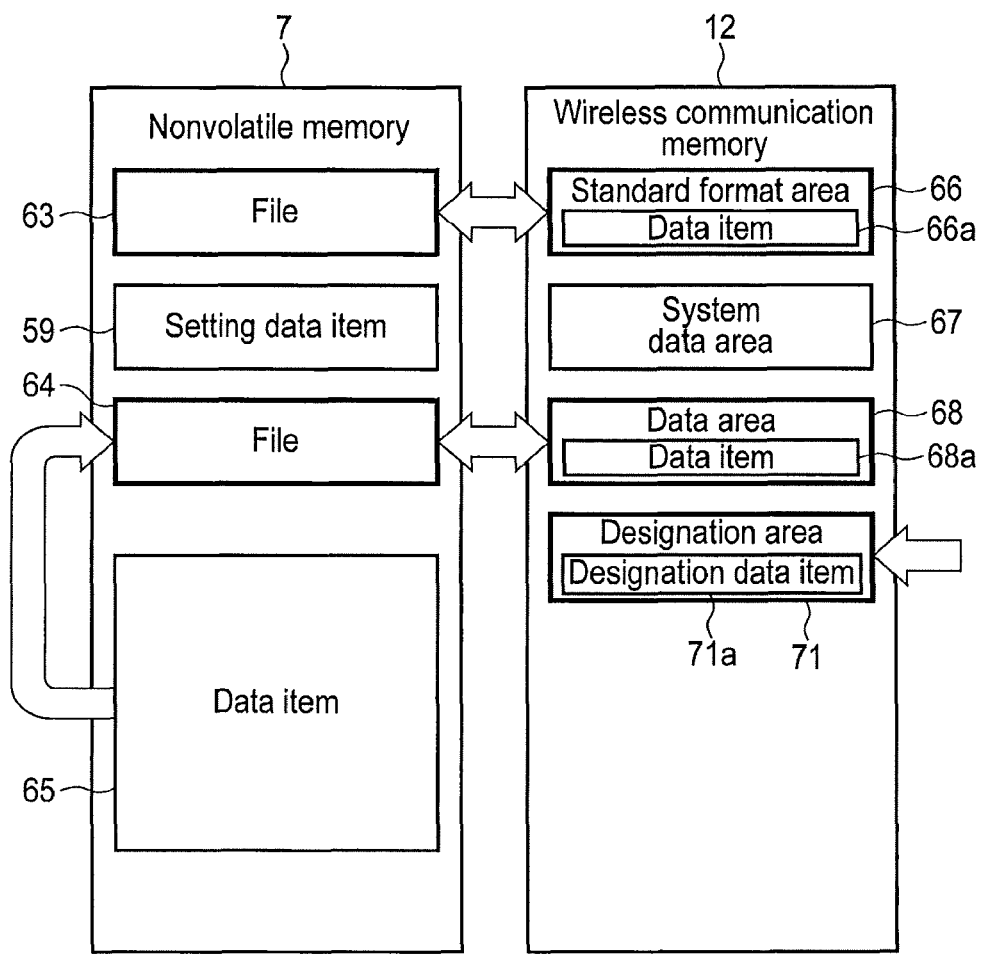
F I G. 28

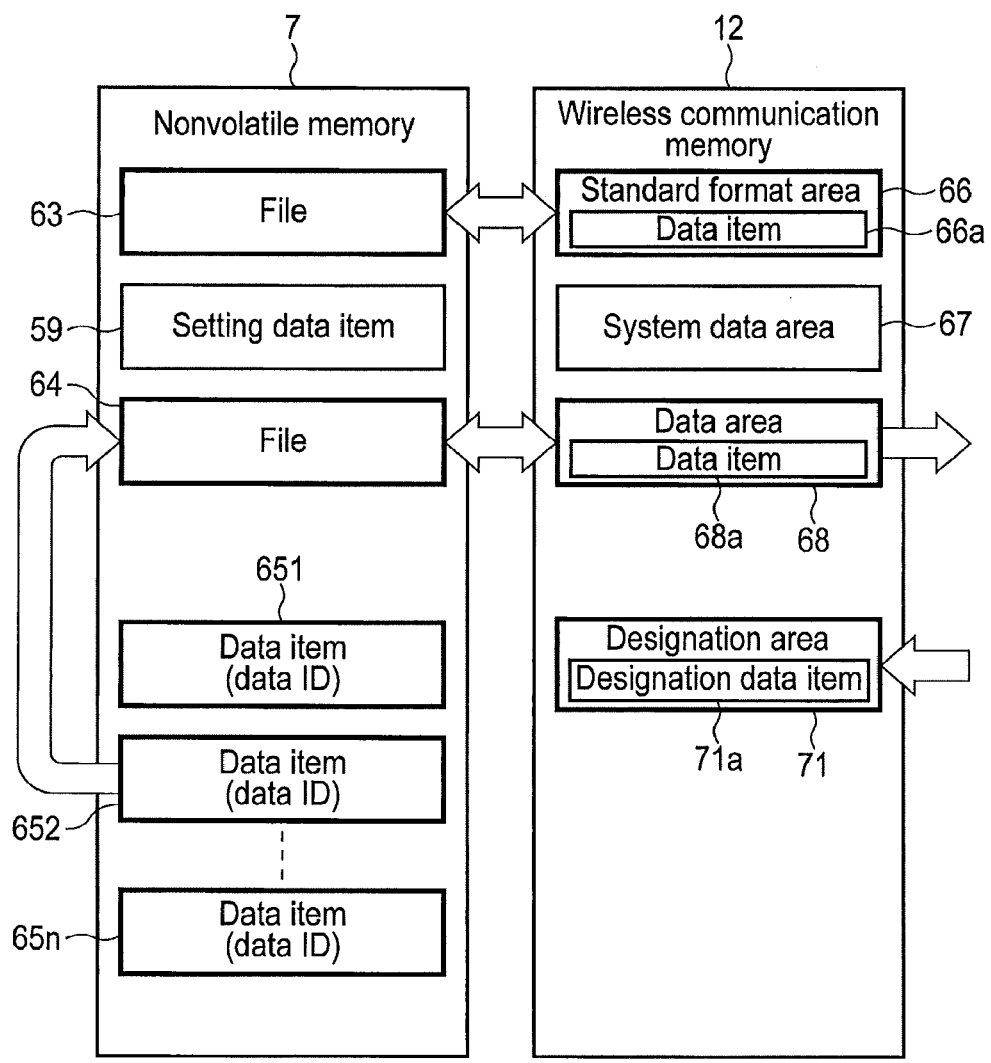
F I G. 29

INFORMATION PROCESSING SYSTEM PERFORMING SYNCHRONIZATION BETWEEN MEMORY DEVICES AND MEMORY DEVICES PERFORMING WIRELESS COMMUNICATION

CROSS-REFERENCE TO RELATED APPLICATIONS

This application is based upon and claims the benefit of priority from Japanese Patent Application No. 2015-138005, filed Jul. 9, 2015, the entire contents of which are incorporated herein by reference.

FIELD

Embodiments described herein relate generally to a memory device performing wireless communication, information processing system, and non-transitory computer readable medium.

BACKGROUND

An example of a storage device is a memory card including a wireless antenna.

BRIEF DESCRIPTION OF THE DRAWINGS

FIG. 1 is a block diagram exemplarily showing a configuration of a memory device including a wireless communication function according to a first embodiment.

FIG. 3 is a flowchart exemplarily showing mirroring performed by a controller according to the first embodiment.

FIG. 4 is a block diagram exemplarily showing a configuration of a terminal device according to the first embodiment.

FIG. 5 is a block diagram exemplarily showing a first configuration of a communication device according to the first embodiment.

FIG. 6 is a block diagram exemplarily showing a second configuration of the communication device according to the first embodiment.

FIGS. 7A and 7B are plan views exemplarily showing an article used for the terminal device according to the first embodiment.

FIG. 8 is a data structural diagram exemplarily showing data stored in a nonvolatile memory according to the first embodiment.

FIG. 15 is a data structural diagram exemplarily showing a first state before and after transferring data items of the nonvolatile memory according to the first embodiment.

FIG. 16 is a block diagram exemplarily showing a second state before and after transferring data items of the nonvolatile memory according to the first embodiment.

FIG. 17 is a block diagram exemplarily showing areas in a wireless communication memory of a memory device including a wireless communication function according to a second embodiment.

FIG. 18 is a block diagram exemplarily showing a relationship between a nonvolatile memory and a wireless communication memory according to a third embodiment.

FIG. 19 is a conceptual diagram exemplarily showing mirroring which is performed when data is stored in the wireless communication memory according to the third embodiment.

FIG. 21 is a flowchart exemplarily showing mirroring which is performed by a controller according to the third embodiment.

FIG. 22 is a block diagram showing an example of flows of data in an information processing system according to a fourth embodiment.

FIG. 24 is a flowchart showing an example of processing for mirroring performed by a controller according to the fourth embodiment.

FIG. 25 is a block diagram showing a first example of mirroring performed by the wireless memory device according to the fourth embodiment.

FIG. 26 is a block diagram showing a second example of mirroring performed by the wireless memory device according to the fourth embodiment.

FIG. 27 is a block diagram showing a third example of mirroring performed by the wireless memory device according to the fourth embodiment.

FIG. 28 is a block diagram showing a fourth example of mirroring performed by the wireless memory device according to the fourth embodiment.

FIG. 29 is a block diagram showing a fifth example of mirroring performed by the wireless memory device according to the fourth embodiment.

DETAILED DESCRIPTION

Figure 2:
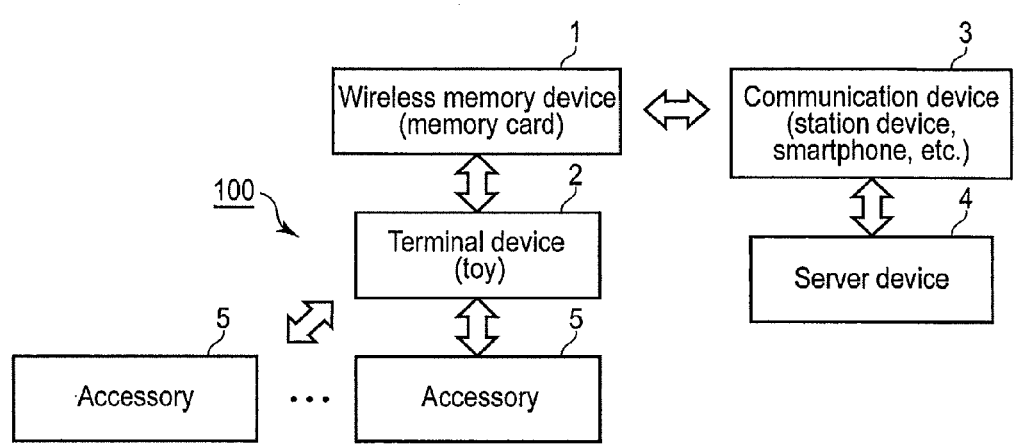
FIG. 2 is a block diagram exemplarily showing a general configuration of an information processing system according to the present embodiment.

In general, according to one embodiment, a memory device includes a nonvolatile memory, a first controller which controls the nonvolatile memory, a wireless antenna, a memory, a voltage detector, a second controller, and a third controller. The wireless antenna is configured to generate electric power based on a radio wave from a first external device. The memory is operable based on the generated electric power. The voltage detector detects a voltage supplied from the wireless antenna. The second controller is operable based on the electric power and performs communication using the wireless antenna when the voltage detector detects a specified voltage. The third controller controls data copy or data transfer between the nonvolatile memory and the memory. The third controller receives, from a second external device, identification information including at least one of first identification information indicating the second external device and second identification information indicating an article used in the second external device and stores the identification information in the memory. The second controller transmits login information and identification information stored in the memory to the first external device via the wireless antenna.

Embodiments will be described with reference to accompanying drawings. In descriptions below, same reference numerals denote nearly or substantive same functions and components, and repetitive descriptions thereof will be given if necessary.

First Embodiment

In a present embodiment, a memory device which includes a wireless communication function (referred to as a wireless memory device) is explained.

In the present embodiment, login information used for logging in includes user identification information (in following descriptions, identification information is noted as ID) and a password. However, the login information may include only the user ID. Alternatively, the login information may include the user ID and data for biometric authentication.

FIG. 1 is a block diagram exemplarily showing a configuration of a wireless memory device 1 according to the present embodiment.

FIG. 2 is a block diagram exemplarily showing a general configuration of an information processing system 100 including the wireless memory device 1 according to the present embodiment.

The information processing system 100 includes the wireless memory device 1, a terminal device 2, a communication device 3 and a server device 4. The information processing system 100 is, for example, an amusement system.

The various memory devices may be used as the wireless memory device 1. For example, the wireless memory device 1 may be a memory card (such as an SD card or a multimedia card), a Universal Serial Bus (USB) memory or a storage device.

The terminal device 2 is, for example, a toy. A user is able to attach an article (referred to as an accessory) 5 for the toy to the terminal device 2 and replace the attached accessory 5 with another accessory 5. The terminal device 2 includes, for example, a slot. A user is able to insert the wireless memory device 1 into the slot of the terminal device 2. The terminal device 2 is electrically connected to the wireless memory device 1 inserted into the slot and receives or transmits data, signals, information, commands, instructions, etc., from/to the wireless memory device 1.

The terminal device 2 may communicate with the accessory 5 bidirectionally as well as the wireless memory device 1. The communication between the terminal device 2 and the accessory 5 is not limited to bidirectional communication. For example, the terminal device 2 may read information attached to the accessory 5. The information attached to the accessory 5 may be, for example, an accessory ID or sound data corresponding to the accessory 5.

For example, the accessory 5 is an accessory corresponding to the terminal device 2. More specifically, the accessory 5 is, for example, a keyring, a strap, a medal, a card, etc. For example, the accessory 5 has a code or a groove indicating the accessory ID. The accessory ID can be read by the terminal device 2.

The accessory ID may be an ID unique to the accessory 5 or may be an ID indicating the type of the accessory 5.

The accessory 5 may have a terminal device ID in addition to the accessory ID. In this case, in addition to the accessory ID, the terminal device ID is read by the terminal device 2.

In the present embodiment, the accessory ID may include the terminal device ID. When the accessory ID includes the terminal device ID, data management and data communication can be performed efficiently and simplified.

The terminal device ID may be an ID unique to the terminal device 2 or may be an ID indicating the type of the terminal device 2. The terminal device 2 may manage the terminal device ID. The terminal device 2 may transmit the terminal device ID to the wireless memory device 1.

The communication device 3 is, for example, an information processing device which includes a communication function, such as a mobile phone including a smartphone, a station device, etc. In the present embodiment, the station device is, for example, a communication device provided in a shopping mall, an electric appliance store, a toy store, etc. The communication device 3 is allowed to receive or transmit data, signals, information, commands, instructions, etc., from/to the wireless memory device 1. The communication device 3 is allowed to receive or transmit data, signals, information, commands, instructions, etc., from/to the server device 4.

The server device 4 is an information processing device which receives or transmits data, signals, information, commands, instructions, etc., from/to the communication device 3 in a wired or wireless manner. The server device 4 realizes a function as a service site which provides each user with various services.

In the present embodiment, for example, near field communication (NFC) is used as wireless communication performed by the wireless memory device 1. NFC is a short-range wireless communication standard that uses the frequency of 13.56 MHz, etc. However, wireless communication performed by the wireless memory device 1 may be different wireless communication such as a wireless local area network (LAN). NFC is capable of performing communication at electric power lower than a common wireless LAN.

The wireless memory device 1 has a function for storing data from the terminal device 2 and reading data from the terminal device 2 by electric power supplied from the terminal device 2 electrically connected to the wireless memory device 1. The wireless memory device 1 also has a function for performing data communication by electric power generated (induced) by electromagnetic induction of a wireless antenna 6 even when the wireless memory device 1 is not electrically connected to the communication device 3. For example, the wireless memory device 1 performs wireless communication, and receives or transmits data from/to the communication device 3. The wireless memory device 1 may be at least partially operable by the electric power generated by the electromagnetic induction based on a radio wave from the communication device 3 even when electric power is not supplied from the terminal device 2.

In the present embodiment, the wireless memory device 1 receives or transmits data from/to the terminal device 2 in accordance with, for example, an SD interface. However, another interface may be used. The wireless memory device 1 receives or transmits data from/to the communication device 3 in accordance with, for example, an NFC interface. However, another wireless communication interface may be used.

In the present embodiment, the terminal device 2 and the communication device 3 are separate devices. However, the terminal device 2 and the communication device 3 may be realized on the same device.

The wireless memory device 1 includes the wireless antenna 6, a nonvolatile memory 7, a controller 8, a communication controller 9, a memory controller 10 and a connection unit 11. The communication controller 9 includes a wireless communication memory 12 and a voltage detector 13. The communication controller 9 may be a structure separated from the wireless communication memory 12. The controller 8, the communication controller 9 and the memory controller 10 may be freely combined with each other or separated from each other.

The controller 8, the memory controller 10 and the nonvolatile memory 7 operate when the electric power is supplied from the terminal device 2 to the wireless memory device 1. When the wireless memory device 1 receives the electric power only via the wireless antenna 6, the controller 8, the memory controller 10 and the nonvolatile memory 7 may not necessarily operate. The communication controller 9 is operable even when the wireless memory device 1 receives the electric power only via the wireless antenna 6. When the wireless antenna 6 receives wireless radio waves of a predetermined frequency conforming to NFC, the communication controller 9 becomes operable. Thus, the wireless memory device 1 is capable of performing NFC.

The nonvolatile memory 7 may be, for example, a nonvolatile semiconductor memory. The nonvolatile memory 7 is, for example, a NAND flash memory. However, the nonvolatile memory 7 may be another nonvolatile semiconductor memory such as a NOR flash memory, a magnetoresistive random access memory (MRAM), a phase-change random access memory (PRAM), a resistive random access memory (ReRAM) or a ferroelectric random access memory (FeRAM). For example, the nonvolatile memory 7 may be another nonvolatile memory or a magnetic memory.

For example, the nonvolatile memory 7 operates when the terminal device 2 supplies the electric power to the wireless memory device 1.

In the present embodiment, the nonvolatile memory 7 stores, for example, a user ID of the user of the terminal device 2, a password, a terminal device ID, an accessory ID, a transfer flag and time data.

The controller 8 receives a command CMD, an address ADD and data DAT from the terminal device 2, the memory controller 10 and the communication controller 9.

The controller 8 outputs a command CMD, an address ADD, data DAT, etc., to the memory controller 10, the communication controller 9 and the terminal device 2 based on the received command CMD.

In the present embodiment, the controller 8 may operate based on software such as firmware, an operating system or an application program.

The controller 8 stores, in the nonvolatile memory 7, the user ID and the password corresponding to the user, the terminal device ID indicating the terminal device 2 used by the user, the accessory ID indicating the accessory 5 used by the terminal device 2, the time data indicating when the accessory ID is stored, and the transfer flag in association with each other.

The transfer flag indicates whether or not the combination of the user ID, the password, the terminal device ID, the accessory ID and the time data stored in the nonvolatile memory 7 was transferred (copied or transcribed) to the wireless communication memory 12.

For example, the controller 8 performs mirroring such that data to be identical with each other between the nonvolatile memory 7 and the wireless communication memory 12 has the same content.

For example, when data for mirroring has been stored or updated in one of the nonvolatile memory 7 and the wireless communication memory 12, the controller 8 performs the mirroring to store the same data or update data with the same content in the other memory.

The controller 8 performs the mirroring in a power feeding state of the wireless memory device 1, for example, in a state where the wireless memory device 1 is inserted into the terminal device 2 by a user. However, even when electric power is not supplied from the wireless memory device 1 to the terminal device 2, the wireless memory device 1 receives data from the communication device 2. Therefore, the controller 8 may perform, for example, the mirroring.

In the present embodiment, the data for the mirroring is, for example, the user ID, the password, the terminal device ID, the accessory ID and the time data.

In the present embodiment, the capacity of the wireless communication memory 12 may be less than that of the nonvolatile memory 7. In this case, the controller 8 manages a status indicating whether or not data can be stored in the wireless communication memory 12 based on a position of a free area of the wireless communication memory 12, the amount of free area, the number of accessory IDs stored in the wireless communication memory 12. When the amount of free area is greater than or equal to a predetermined threshold, and further when the wireless communication memory 12 has a status indicating that data can be stored, the controller 8 selects data which has permission for the mirroring, and applies the mirroring of the selected data from the nonvolatile memory 7 to the wireless communication memory 12. When the data which has the permission for the mirroring is selected, for example, data (in other words, a terminal device ID and an accessory ID) related to a transfer flag indicating that transfer has not been performed and related to time data indicating new time may be prioritized.

In this manner, when a part of data of the nonvolatile memory 7 can be stored in the wireless communication memory 12, but when the whole data cannot be stored, the controller 8 is capable of selecting a part of data in the nonvolatile memory 7 and storing the selected data in the wireless communication memory 12.

When the controller 8 receives an instruction from the communication device 3, or when the nonvolatile memory 7 stores a new accessory ID, the controller 8 may transfer data from the nonvolatile memory 7 to the wireless communication memory 12.

The controller 8 may compress data to be stored in the wireless communication memory 12 and store the compressed data in the wireless communication memory 12 via the communication controller 9. The controller 8 compresses the data, using, for example, a Huffman code. The controller 8 may reads the compressed data stored in the wireless communication memory 12 via the communication controller 9, decompresses the compressed data read from the wireless communication memory 12, and outputs the decompressed data as read data to the terminal device 2 via the connection unit 11 or stores the decompressed data as the read data in the nonvolatile memory 7 via the memory controller 10. Compression and decompression of data may be performed by the controller 8. Alternatively, the wireless memory device 1 may includes a compressor and a decompressor unit. The controller 8 may cause the compressor to compress data and may cause the decompressor to decompress data.

The memory controller 10 controls the nonvolatile memory 7. The memory controller 10 stores data in the nonvolatile memory 7 based on a command CMD, etc., input from the controller 8. The memory controller 10 reads data from the nonvolatile memory 7 based on a command CMD, etc., input from the controller 8 and outputs the data to the controller 8. The memory controller 10 may communicate with the communication controller 9 or the terminal device 2 without intervention of the controller 8.

The wireless antenna 6 is, for example, a PCB pattern antenna. A frequency band at which the wireless antenna 6 is operable may be a predetermined frequency band conforming to NFC.

The wireless antenna 6 is capable of generating electric power by electromagnetic induction based on, for example, radio waves from the communication device 3. The wireless antenna 6 supplies the generated electric power to the communication controller 9.

The wireless antenna 6 receives a command CMD, an address ADD and data DAT from the communication device 3. The wireless antenna 6 outputs the received command CMD, etc., to the communication controller 9.

The communication controller 9 communicates with, for example, the communication device 3 via the wireless antenna 6 based on a detecting result of the voltage detector 13. The communication controller 9 receives a command CMD, an address ADD, data DAT, etc., from the controller 8 or the wireless antenna 6. For example, the communication controller 9 outputs data DAT, etc., to the controller 8 or the wireless antenna 6 based on the received command CMD. The communication controller 9 reads data DAT from the wireless communication memory 12 based on the received command CMD, address ADD, etc., and outputs the data DAT to the controller 8 or the wireless antenna 6. The communication controller 9 further stores data DAT in the wireless communication memory 12 based on the received command CMD, address ADD, data DAT, etc.

A command CMD, an address ADD and data DAT may not necessarily have the same format in communication between the terminal device 2, the controller 8, the memory controller 10, the communication controller 9 and the wireless antenna 6. As long as a command CMD, an address ADD, data DAT can be recognized by both of communication parties, the format of the command CMD, the address ADD or the data DAT may not conform to that of a command CMD, an address ADD or data DAT transmitted between other units.

When the communication controller 9 receives a data storage command CMD and data DAT via the controller 8 or the wireless antenna 6, the communication controller 9 stores the data DAT in the wireless communication memory 12. The communication controller 9 may not necessarily write the data to the wireless communication memory 12.

The wireless communication memory 12 is, for example, a nonvolatile memory. The wireless communication memory 12 stores data in accordance with control by the communication controller 9 or the memory controller 10. Storage of data in the wireless communication memory 12 may be temporal. For example, an electrically erasable programmable read-only memory (EEPROM) is used as the wireless communication memory 12. However, various types of memories may be used in a manner similar to that of the nonvolatile memory 7.

To enable the wireless communication memory 12 to operate with electric power supplied from the wireless antenna 6, the nonvolatile memory used as the wireless communication memory 12 preferably has power consumption per unit capacity less than that of the nonvolatile memory 7. Specifically, a NOR memory may be used.

In the present embodiment, the wireless communication memory 12 stores a part of or the whole part of data stored in the nonvolatile memory 7. For example, the wireless communication memory 12 stores a user ID, a password, a terminal device ID, an accessory ID, a transmission flag and time data.

The transmission flag indicates whether or not the wireless memory device 1 transmitted the user ID, the password, the terminal device ID, the accessory ID and the time data stored in the wireless communication memory 12 to the communication device 3. The transmission flag indicates whether or not the wireless memory device 1 transmitted the user ID, the password, the terminal device ID, the accessory ID and the time data stored in the wireless communication memory 12 to the server device 4 via the communication device 3 and registered the terminal device ID, the accessory ID and the time data with the site of the server device 4.

The wireless communication memory 12 may store, for example, data related to the wireless memory device 1 (a part of data stored in the nonvolatile memory 7 (for example, image data, sound data (music data, voice data, etc.,), video data, etc.,), data related to data stored in the nonvolatile memory 7, and data related to the nonvolatile memory 7 and the wireless communication device 1), data related to the communication device 3, data related to the accessory 5 attached to the terminal device 2, or a command CMD received from the controller 8, the communication device 3, etc.

Specific examples are explained below. Data to be stored in the wireless communication memory 12 is not limited to the examples described below.

Data related to image data stored in the nonvolatile memory 7 is data of file name, the first or last part of image data or thumbnail image data of image data, data of file generation time, data of capture time, a data ID, etc.

Data related to sound data stored in the nonvolatile memory 7 is data of file name, the first or last part of sound data or data of playback time of sound data, data of file generation time, a data ID, etc.

Data related to the nonvolatile memory 7 is data of capacity of the nonvolatile memory 7, data of remaining capacity, data of the number of files, etc.

Data related to the wireless memory device 1 is data of recognition ID (the identification number arbitrarily allocated for the wireless memory device 1, for example, a unique product ID allocated at the time of manufacturing, or an ID arbitrarily allocated for the wireless memory device 1 afterward) or a comment (text data which is stored by a user in the wireless memory device 1 via the terminal device 2 in association with the wireless memory device 1), etc.

Data related to the terminal device 2 is data of recognition ID of the terminal device 2, update data of firmware of the terminal device 2 or flag data generated based on the above data of recognition ID or update data, etc.

Data related to the accessory 5 is data of recognition ID of the accessory 5, data included in a code provided in the accessory 5 or flag data generated based on the above data of recognition ID and data included in the code, etc.

The voltage detector 13 is electrically connected to the wireless antenna 6. The voltage detector 13 detects voltage supplied from the wireless antenna 6 to the communication controller 9. The voltage detector 13 outputs a reset command for NFC until the communication controller 9 reaches a specified (predetermined) voltage with which the communication controller 9 is operable. The communication controller 9 does not perform NFC while the reset command is received. By the reset command, it is possible to prevent abnormal starting or abnormal operation of NFC. When the specified voltage has been reached, the voltage detector 13 may output an operable command to the communication controller 9. Only when the communication controller 9 has received an operable command, the communication controller 9 performs NFC.

The connection unit 11 is, for example, a standardized connection terminal, and can be connected to the terminal device 2.

FIG. 3 is a flowchart exemplarily showing mirroring performed by the controller 8 according to the present embodiment.

In step V1, the controller 8 manages a status indicating whether or not data can be stored in the wireless communication memory 12 based on a position of a free area in the wireless communication memory 12, the amount of the free area, the number of accessory IDs stored in the wireless communication memory 12, etc. For example, the controller 8 has a status indicating that data can be stored in the wireless communication memory 12 when the amount of the free area is greater than or equal to a first threshold. For example, the controller 8 has a status indicating that data can be stored in the wireless communication memory 12 when the number of accessory IDs stored in the wireless communication memory 12 is less than or equal to a second threshold.

In step V2, the controller 8 determines whether or not data for mirroring is stored or updated in at least one of the nonvolatile memory 7 and the wireless communication memory 12.

When the data for mirroring is not stored or updated in at least one of the memories, the processing is terminated.

When the data for mirroring is stored or updated in at least one of the memories, the controller 8 determines whether or not data can be stored in the wireless communication memory 12 based on the status in step V3.

When data cannot be stored in the wireless communication memory 12, the controller 8 terminates the processing or performs error processing in step V4. Specific examples of the error processing are explained in step T6 of FIG. 12 later.

When data can be stored in the wireless communication memory 12, the controller 8 performs mirroring in step V5. For example, the controller 8 selects, from the nonvolatile memory 7, data which is related to a transfer flag indicating that transfer has not been performed and related to time data indicating new time, as data which has permission for mirroring. The controller 8 transfers the selected data from the nonvolatile memory 7 to the wireless communication memory 12. In this manner, the controller 8 is capable of storing, in the wireless communication memory 12, for example, data related to a toy which has been used by a user recently by selecting new data.

FIG. 4 is a block diagram exemplarily showing a configuration of the terminal device 2 according to the present embodiment.

The terminal device 2 includes an accessory attaching unit 1310, a code recognition unit 1320, a memory card holding unit 1330, a speaker 1340 and a controller 1390.

A memory device, for example, a memory card, can be inserted from outside to the memory card holding unit 1330. In the present embodiment, the memory card holding unit 1330 holds the wireless memory device 1, for example, a memory card including an NFC chip.

The accessory attaching unit 1310 holds, for example, the accessory 5 inserted from outside. The accessory attaching unit 1310 may hold the accessory 5 without insertion from outside. For example, the accessory attaching unit 1310 may be a ring-shaped attaching tool for holding the accessory 5 such as a keyring.

The accessory 5 is, for example, a card on which a character is drawn. For example, one character is drawn on one accessory 5. However, the accessory 5 is not limited to this example. A plurality of characters may be drawn on one accessory 5. Information related the drawn character is stored in the accessory 5. The accessory 5 has this information in, for example, a code format. However, the accessory 5 is not limited to this example. For example, the accessory 5 may include an NFC chip. The information related to the character may be stored in the NFC chip. When the information related to the character is stored in the NFC chip or an NFC tag, the information can be changed afterward. For example, it is possible to easily upgrade the character in the information processing system 100.

When the information related to the drawn character is stored in the code format, and the accessory 5 is held by the accessory attaching unit 1310, the code of the accessory 5 faces the code recognition unit 1320.

The code recognition unit 1320 receives an instruction from outside, reads the information related to the drawn character from the code of the accessory 5 and transmits the information related to the character to the wireless memory device 1. The information related to the character includes address information to be read in the nonvolatile memory 7 included in the wireless memory device 1.

The controller 8 of the wireless memory device 1 receives the information related to the character and reads corresponding information. Specifically, the controller 8 outputs a read instruction and an address to the memory controller 10. The memory controller 10 reads data from a memory of an address corresponding to the information related to the character, and outputs the read data to the controller 8. The wireless memory device 1 outputs the data to the speaker 1340.

The speaker 1340 converts the data into sound data via a digital-to-analog converter (omitted in the figure) and outputs the sound data to outside. A user is able to listen to the sound data corresponding to the accessory 5 attached to the terminal device 2.

The speaker 1340 may simply output the sound data to outside based on data read from the accessory 5.

The terminal device 2 may include a display unit (display) 1350. When the read data includes sound data and moving image data, the terminal device 2 may output the sound data from the speaker 1340 and display the moving image data in the display unit 1350. The terminal device 2 may display the moving image data in the display unit 1350 without outputting the sound data from the speaker 1340.

The controller 1390 controls the code recognition unit 1320, the speaker 1340 and the display unit 1350. The controller 1390 communicates with the wireless memory device 1 held by the memory card holding unit. The controller 1390 may include a cache memory 1395. The cache memory 1395 temporarily stores data.

FIG. 5 is a block diagram exemplarily showing a first configuration of the communication device 3 according to the present embodiment. The communication device 3 is a device which includes a wireless communication function, such as a smartphone, a personal digital assistant (PDA), a tablet terminal, etc.

The communication device 3 includes a battery unit 1070, a wireless antenna 1075, a communication controller 1080, a controller 1085, a storage unit 1090, a display unit 1095, an input unit 1100, a wireless communication unit 1105, an imaging unit 1110 and a speaker 1115. The communication controller 1080 and the controller 1085 may be realized as one controller.

The communication device 3 can be operated and communicated by electric power supplied from the battery unit 1070.

The communication device 3 is capable of receiving or transmitting data in accordance with, for example, an NFC interface. The communication device 3 may use other wireless communication interfaces.

The battery unit 1070 is a power source which supplies electric power to the communication device 3. The battery unit 1070 is, for example, a battery. The battery unit 1070 may be a dry-cell battery, a storage battery or a fuel battery. More specifically, as the battery unit 1070, for example, a lithium-ion battery may be used. The battery unit 1070 may be provided outside the communication device 3. For example, the battery unit 1070 may be an AC adapter connected to a commercial power source.

A frequency band at which the wireless antenna 1075 is operable is set to a predetermined frequency band conforming to NFC.

The wireless antenna 1075 receives a command CMD, an address ADD and data DAT and outputs the received data to the communication controller 1080. The wireless antenna 1075 outputs a command CMD, an address ADD and data DAT input from the communication controller 1080. The wireless antenna 1075 is, for example, a PCB pattern antenna.

The communication controller 1080 controls the wireless antenna 1075. The communication controller 1080 is capable of outputting a command CMD, an address ADD, data DAT, etc., received from the controller 1085 via the wireless antenna 1075. The communication controller 1080 is capable of outputting the data received by the wireless antenna 1075 to the controller 1085.

For example, based on input from the input unit 1100, the wireless communication unit 1105, the imaging unit 1110 and the wireless memory device 1, the controller 1085 controls operations of the units. The controller 1085 controls the units based on the input data or a result of calculation of the input data and outputs commands, etc., to the units depending on the need.

The controller 1085 is realized as, for example, a semiconductor chip, a circuit formed on a substrate or a combination or combinations thereof. The controller 1085 may include at least one of a cache memory and a register for temporarily storing data.

The controller 1085 is capable of outputting a command CMD, an address ADD, data DAT, etc., to the wireless antenna 1075 via the communication controller 1080. The controller 1085 receives the command CMD, address ADD and data DAT received by the wireless antenna 1075, and data read from the wireless memory device 1.

The controller 1085 outputs data input from each unit or a result of calculation of the input data, a write command CMD and an address ADD to the communication controller 1080 when data for the wireless memory device 1 is written.

The controller 1085 is electrically connected to each unit and electrically communicates with each unit. The controller 1085 is capable of receiving data from each unit and outputting the received data or a result of calculation of the received data. For example, the controller 1085 is capable of calculating (generating) composite image data in which enhancement processing is applied to data captured by the imaging unit 1110. The controller 1085 is capable of outputting the composite image data to the display unit 1095. For example, the controller 1085 is capable of calculating (generating) composite image data based on image data read from the storage unit 1090. The controller 1085 is capable of outputting the composite image data to the display unit 1095. The above descriptions are merely examples. The controller 1085 is capable of receiving data from each unit and outputting a result of calculation of the received data.

The storage unit 1090 outputs stored data to the controller 1085 based on communication with the controller 1085. The storage unit 1090 stores data received from the controller 1085 based on communication with the controller 1085. The storage unit 1090 includes, for example, a memory controller and a nonvolatile memory. As the nonvolatile memory, various types of memories can be used in a manner similar to that of the nonvolatile memory 7. The memory controller controls the nonvolatile memory. The storage unit 1090 may be, for example, a hard disk drive (HDD) or a solid-state drive (SSD).

The display unit 1095 outputs data received from the controller 1085 in a format which can be recognized by a user. The display unit 1095 is, for example, a display. A user is able to recognize the display visually. Various types of displays may be used as the display unit 1095. Specifically, for example, a liquid crystal display, a plasma display, an organic electroluminescent display, a three-dimensional display, etc., may be used. The display unit 1095 displays data received from the controller 1085 on the display. For example, the display unit 1095 is capable of displaying data of image or moving image captured by the imaging unit 1110 substantially in real time.

The input unit 1100 outputs input by a user to the controller 1085 as input data. The input unit 1100 is, for example, a touchpanel attached to the display. When a user presses the display, the input unit 1100 detects a pressed position on the touchpanel and outputs position information to the controller 1085 as input data. Various types of touchpanels may be used as the input unit 1100. Specifically, for example, a switch arrayed in matrix, a resistive film type, a surface acoustic wave type, an infrared light type, an electromagnetic induction type or a capacitive type may be employed.

The input unit 1100 may be, for example, a microphone. When a user speaks, the input unit 1100 may detect speech, extract input data by speech conversion and output the data to the controller 1085.

The wireless communication unit 1105 includes a wireless antenna and a wireless controller. The wireless communication unit 1105 receives or transmits data from/to outside wirelessly. The wireless communication unit 1105 outputs data received from outside to the controller 1085. The wireless communication unit 1105 transmits data received from the controller 1085 to outside.

The imaging unit 1110 is capable of capturing a still image, a moving image or both of them. The imaging unit 1110 outputs image data (capture data), in other words, data of still image or moving image, to the controller 1085. The imaging unit 1110 may capture a code provided on the surface of the wireless memory device 1. The imaging unit 1110 is, for example, a camera. More specifically, the imaging unit 1110 is a camera using a solid-state imaging element such as a charge coupled device (CCD) sensor or a complementary metal oxide semiconductor (COMS) sensor.

The speaker 1115 plays sound data input from the controller 1085.

FIG. 6 is a block diagram exemplarily showing a second configuration of the communication device 3 according to the present embodiment. The communication device 3 exemplarily shown in FIG. 6 is a station device.

The communication device 3 includes an NFC transmission/reception unit 1610, a display unit (display) 1620, a speaker 1630, an input unit 1640, a storage unit 1650, a communication unit 1660 and a controller 1670.

The NFC transmission/reception unit 1610 communicates with outside of the communication device 3 by NFC in accordance with an instruction from the controller 1670. For example, the NFC transmission/reception unit 1610 communicates with the wireless memory device 1 by NFC.

The display unit 1620 is an arbitrary display such as a liquid crystal display or an organic electroluminescent display. The display unit 1620 displays that NFC is performed in progress during NFC on the display. The display unit 1620 displays that communication was finished at the end of communication on the display.

The speaker 1630 generates sound in accordance with an instruction from the controller 1670.

The input unit 1640 includes, for example, a keyboard or a button. Alternatively, the display unit 1620 may be a display, and a touchpanel may be the input unit 1640.

The storage unit 1650 includes, for example, an arbitrary storage element such as an HDD, an SSD or a flash memory. The storage unit 1650 stores, for example, data to be transmitted to outside. This data includes, for example, sound data or moving image data of a character.

The communication unit 1660 communicates with the server device 4 which is external of the communication device 3 via wired or wireless communication in accordance with an instruction from the controller 1670. The communication unit 1660 obtains data to be stored in the storage unit 1650 from the external server device 4.

The controller 1670 controls the NFC transmission/reception unit 1610, the display unit 1620, the speaker 1630, the input unit 1640, the storage unit 1650 and the communication unit 1660.

FIG. 7 is a plan view exemplarily showing the accessory 5 according to the present embodiment.

FIG. 7A is a plan view exemplarily showing a surface (a top surface) of the accessory 5.

FIG. 7B is a plan view exemplarily showing the other surface (a rear surface) of the accessory 5.

The accessory 5 includes, for example, a character and a code 1710. The code 1710 can be detected by using the code recognition unit 1320 provided in the terminal device 2.

FIG. 8 is a data structural diagram exemplarily showing data D1 stored in the nonvolatile memory 7 according to the present embodiment.

The controller 8 manages data D1 in the nonvolatile memory 7 via the memory controller 10.

The data D1 includes a user ID and a password of the user. When the password is stored in the wireless communication memory 12, the data D1 may not include the password.

The user ID and the password are associated with the terminal device IDs used by the user.

When the user mounts the wireless memory device 1 on a new terminal device 2, a new terminal device ID is associated with the user ID and a password.

When the user attaches a new accessory 5 to the terminal device 2, a new accessory ID is associated with the terminal device ID.

When a new accessory ID is added, time data indicating a storage time of the new accessory ID is associated with the new accessory ID.

In the present embodiment, the data D1 includes a transfer flag indicating whether or not a user ID, a password, a terminal device ID, an accessory ID and time data associated with each other have been transferred from the nonvolatile memory 7 to the wireless communication memory 12.

Figure 9:
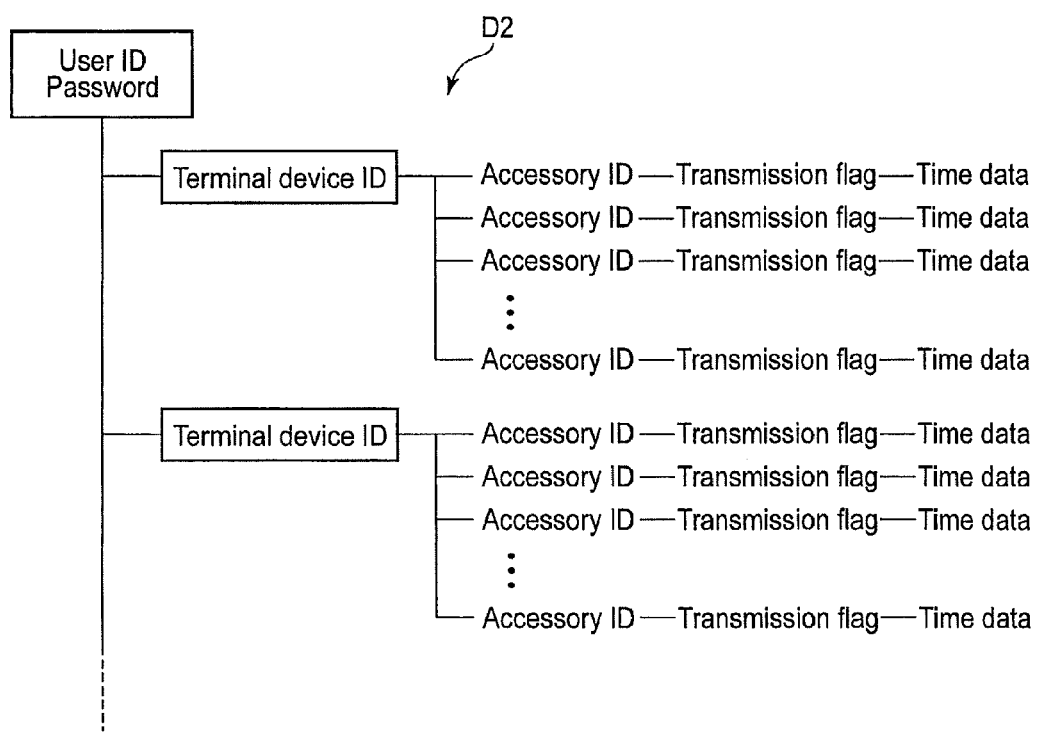
FIG. 9 is a data structural diagram exemplarily showing data stored in a wireless communication memory according to the first embodiment.

FIG. 9 is a data structural diagram exemplarily showing data D2 stored in the wireless communication memory 12 according to the present embodiment.

When the free area in the wireless communication memory 12 is sufficient (in other words, when the amount of stored data is less than or equal to a threshold), the controller 8 selects a part of the data D1 in the nonvolatile memory 7 or extracts the whole data D1, and stores the selected or extracted data in the wireless communication memory 12. The controller 8 reads or updates the data D2 in the wireless communication memory 12 via the communication controller 9.

The data D2 includes, for example, a part of the data D1 or the whole data D1 in the nonvolatile memory 7. Specifically, the data D2 includes a user ID and a password of the user.

The data D2 includes, instead of the transfer flag of the data D1, a transmission flag indicating whether or not a user ID, a password, a terminal device ID and time data associated with each other have been transmitted from the wireless communication memory 12 to the communication device 2.

In the data D2, data transmitted from the wireless communication memory 12 to the communication device 3 can be identified by the transmission flag. However, out of the data D2, data which became unnecessary because of transmission from the wireless communication memory 12 to the communication device 3 may be deleted from the data D2.

Figure 10:
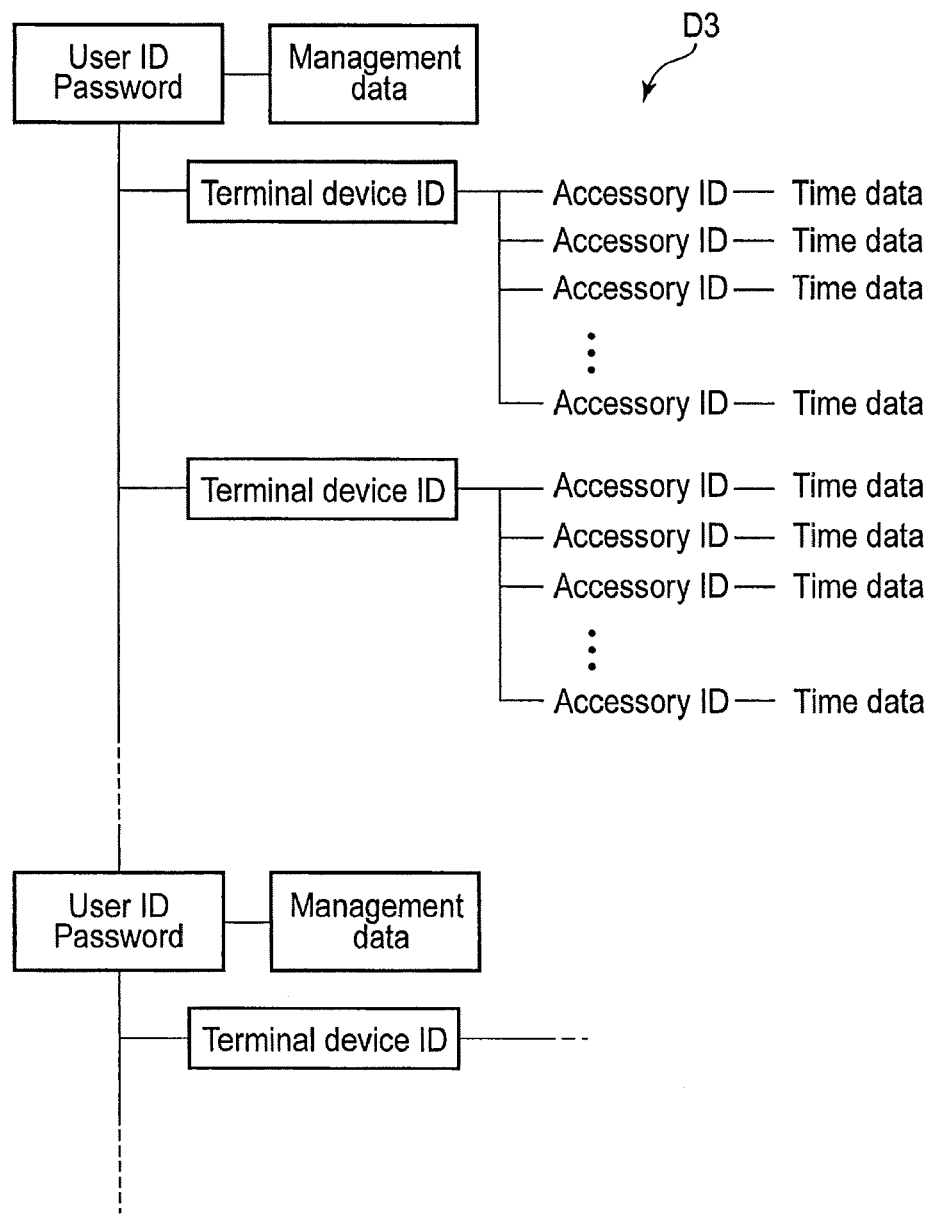
FIG. 10 is a data structural diagram exemplarily showing data stored in a server device according to the first embodiment.

FIG. 10 is a data structural diagram exemplarily showing data D3 stored in the server device 4 according to the present embodiment.

The server device 4 receives a user ID, a password, a terminal device ID, an accessory ID and time data from the communication device 3.

The data D3 in the server device 4 includes a user ID, a password and management data of each user registered with the site. The management data includes personal data of the user, such as a name, a date of birth, an address, a telephone number and an age.

When the server device 4 receives the user ID, the password, the terminal device ID, the accessory ID and the time data from the communication device 3, the server device 4 automatically logs in to the site based on the received user ID and password, and registers the received terminal device ID, accessory ID and time data with the data D3 in association with the corresponding user ID and password.

In this manner, an operator of the site can obtain history data indicating which user used which terminal device and which accessory.

Figure 11:
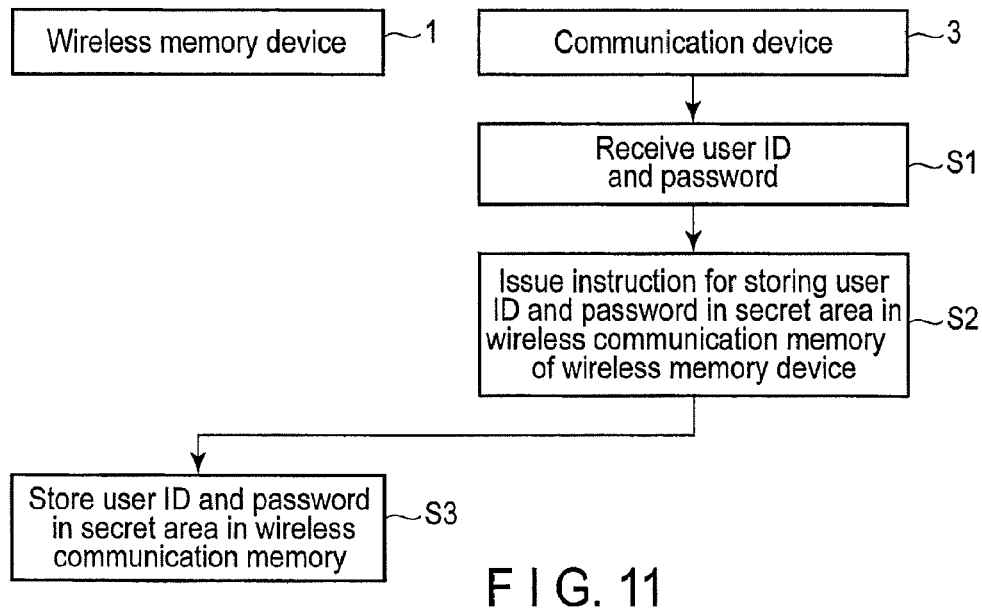
FIG. 11 is a flowchart exemplarily showing processing for setting user identification information and a password according to the present embodiment.

FIG. 11 is a flowchart exemplarily showing processing for setting a user ID and a password according to the present embodiment.

In step S1, the communication device 3 receives the user ID and the password from the user.

In step S2, the communication device 3 issues an instruction for storing the user ID and the password in a secret area in the wireless communication memory 12 of the wireless memory device 1.

In step S3, the wireless communication device 1 stores the user ID and the password in the secret area in the wireless communication memory 12 of the wireless memory device 1. In the present embodiment, as explained in FIG. 8 above, the user ID and the password are stored in a secret area in the nonvolatile memory 7 as well as the wireless communication memory 12. Out of the user ID and the password, only the user ID may be stored in the nonvolatile memory 7. The password may not be stored in the nonvolatile memory 7.

The secret areas are areas in which only an authorized user or device is allowed to perform reading or writing, and an unauthorized user or device is not allowed to perform reading or writing. For example, the controller 8 may restrict accesses to the secret area of the nonvolatile memory 7 and the secret area of the wireless communication memory 12. For example, the memory controller 10 may restrict the access to the secret area of the nonvolatile memory 7. For example, the communication controller 9 may restrict the access to the secret area of the wireless communication memory 12.

Figure 12:
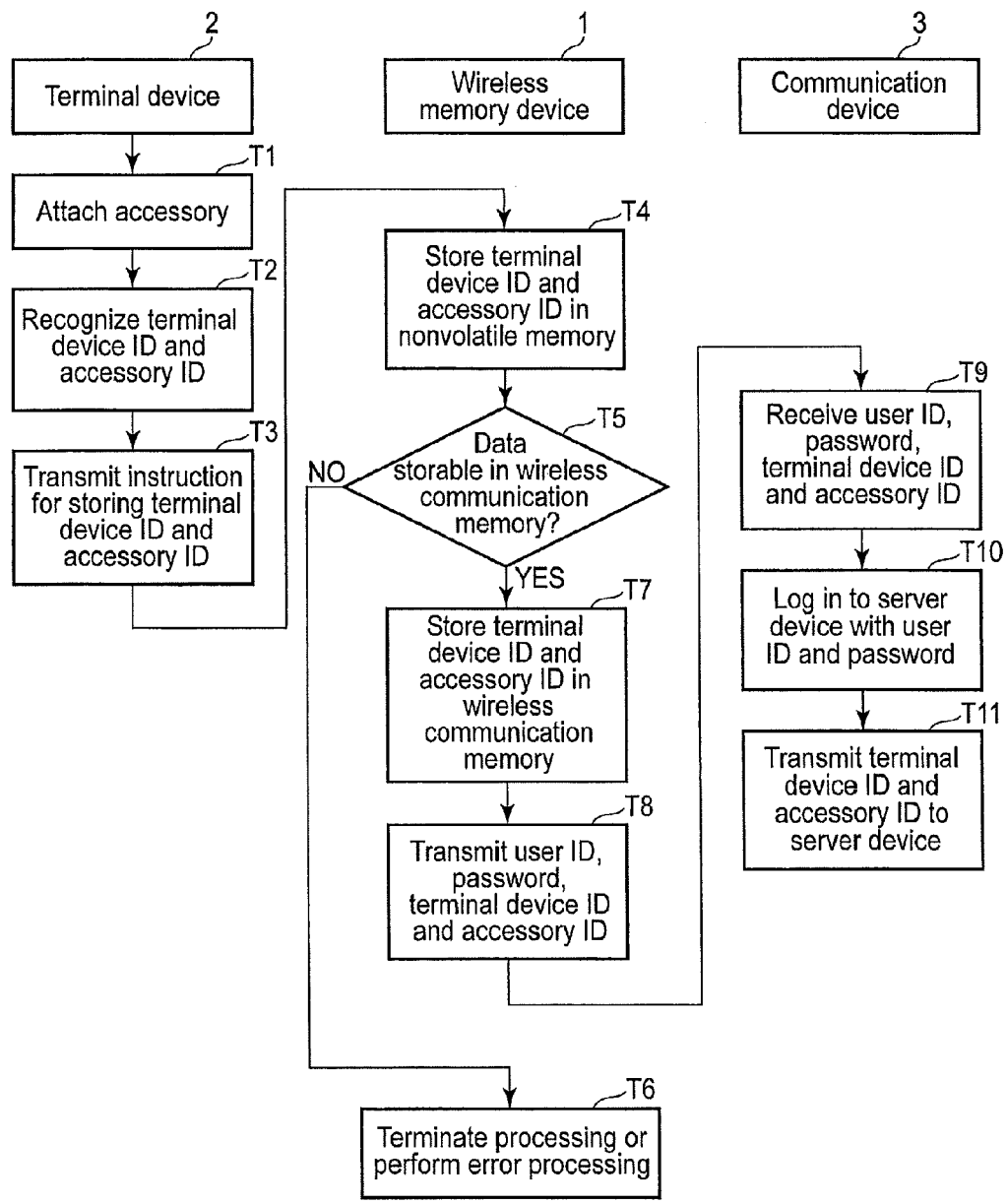
FIG. 12 is a flowchart exemplarily showing processing for registering identification information according to the first embodiment.

FIG. 12 is a flowchart exemplarily showing processing for registering a terminal device ID and an accessory ID according to the present embodiment.

In step T1, the user attaches the accessory 5 to the terminal device 2.

In step T2, the terminal device 2 recognizes the terminal device ID and accessory ID attached to the accessory 5. For example, the terminal device 2 reads a bit code, a barcode or a two-dimensional barcode attached to the accessory 5 by a sensor or read device and obtains the terminal device ID and the accessory ID.

In step T3, the terminal device 2 transmits an instruction for storing the terminal device ID and the accessory ID to the wireless memory device 1.

In step T4, the wireless memory device 1 receives the terminal device ID and the accessory ID from the terminal device 2 and stores, in the data D1 in the nonvolatile memory 7, the terminal device ID and the accessory ID associated with the user ID and the password.

In step T5, the wireless memory device 1 determines whether or not the wireless communication memory 12 has a free area and whether or not data can be stored in the wireless communication memory 12.

When data cannot be stored in the wireless communication memory 12, the wireless memory device 1 terminates the processing or performs error processing in step T6. For example, in the error processing, an instruction for outputting sound or displaying a screen to prompt registration of the accessory ID with the site of the server device 4 may be issued to the terminal device 2 or the communication device 3. The terminal device 2 or the communication device 3 which received the instruction from the wireless communication memory 12 outputs the sound or displays the screen to prompt registration of the accessory ID with the site. The user is able to start an operation for registering the accessory ID with the site in accordance with the output sound or the displayed screen. In the error processing, the wireless memory device 1 itself may perform processing for prompting the user to register the accessory ID with the site.

When data can be stored in the wireless communication memory 12, the wireless memory device 1 selects a terminal device ID, an accessory ID and time data associated with a transfer flag indicating that transfer has not be performed from the data D1 of the nonvolatile memory 7, and stores the terminal device ID, the accessory ID and the time data in the data D2 of the wireless communication memory 12 in association with the corresponding user ID and accessory ID in step T7.

From the data D1 of the nonvolatile memory 7, the wireless memory device 1 may select a terminal device ID related to a transfer flag indicating that transfer has not been performed and related to the latest time data, and an accessory ID and time data related to the terminal device ID, as the transfer target.

In step T8, the wireless memory device 1 selects a user ID, a password, a terminal device ID, an accessory ID and time data related to a transmission flag indicating that transmission has not been performed from the wireless communication memory 12, and transmits the selected user ID, the password, the terminal device ID, the accessory ID and the time data to the communication device 3 by NFC.

In step T9, the communication device 3 receives the user ID, the password, the terminal device ID, the accessory ID and the time data from the wireless memory device 1 by NFC.

In step T10, the communication device 3 accesses the site of the server device 4 and logs in to the service site with the user ID and the password.

In the present embodiment, the communication device 3 or an application program executed on the communication device 3 manages information which allows the communication device 3 to be connected to the site of the server device 4, such as a uniform resource locator (URL). However, the information which allows the communication device 3 to be connected to the site may be stored in the nonvolatile memory 7 or the wireless communication memory 12 of the wireless memory device 1. The communication device 3 may receive the information from the wireless memory device 1 by NFC.

In step T11, the communication device 3 transmits the terminal device ID and the accessory ID corresponding to the user ID and the password to the server device 4, issues an instruction for logging in to the service site, and issues an instruction for registering the terminal device ID, the accessory ID and the time data.

Figure 13:
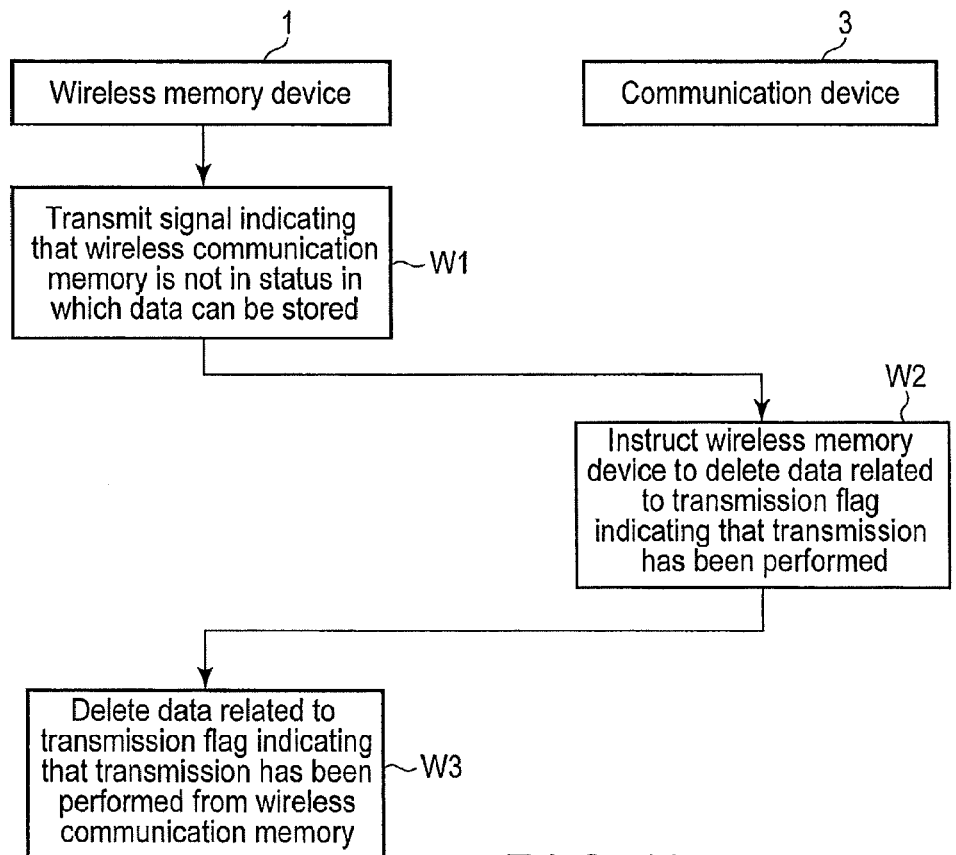
FIG. 13 is a flowchart exemplarily showing processing which is performed when data cannot be stored in a wireless communication memory of the memory device including the wireless communication function according to the first embodiment.

FIG. 13 is a flowchart exemplarily showing processing which is performed when data cannot be stored in the wireless communication memory 12 of the wireless memory device 1 according to the present embodiment. The processing shown in FIG. 13 is performed in place of step V4 of FIG. 3 or step T6 of FIG. 12 described above.

In step W1, the wireless memory device 1 transmits, to the communication device 3, a signal indicating that the wireless communication memory 12 is not in a status in which data can be stored.

In step W2, the communication device 3 instructs the wireless memory device 1 to delete data related to a transmission flag indicating that transmission has been performed based on the signal received from the communication device 3.

In step W3, the wireless memory device 1 deletes, from the wireless communication memory 12, data related to the transmission flag indicating that transmission has been performed.

Figure 14:
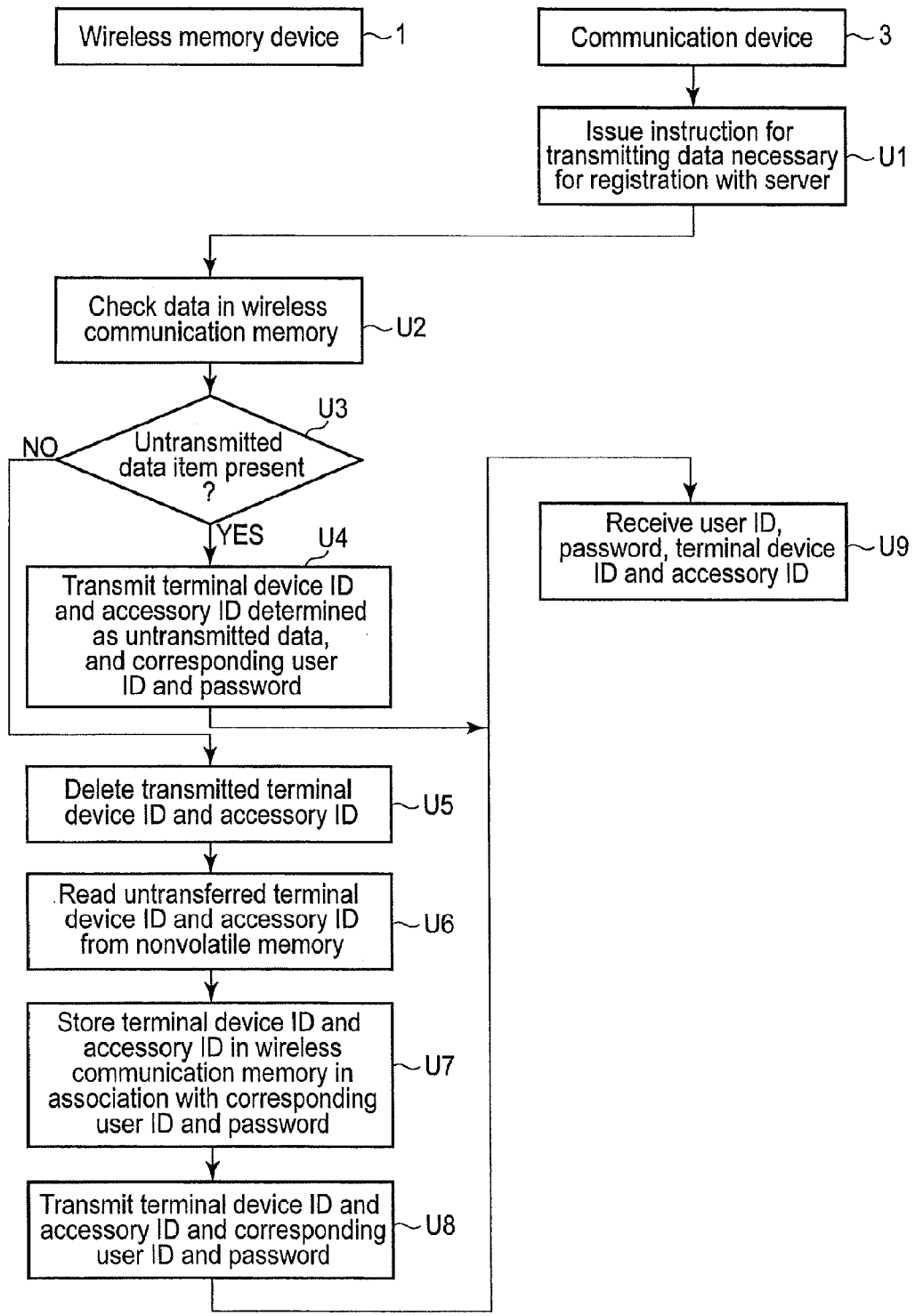
FIG. 14 is a flowchart exemplarily showing data transmission from the memory device including the wireless communication function to the communication device according to the first embodiment.

FIG. 14 is a flowchart exemplarily showing data transmission from the wireless memory device 1 to the communication device 3 according to the present embodiment. FIG. 14 corresponds to steps T8 and T9 shown in FIG. 12 described above.

In step U1, the communication device 3 transmits, to the wireless memory device 1, an instruction for transmitting data necessary for registration with the server device 4.

In step U2, the wireless memory device 1 checks the data D2 in the wireless communication memory 12. For example, the wireless memory device 1 recognizes a terminal device ID, an accessory ID and time data related to a transmission flag indicating that transmission has not been performed out of the data D2 in the wireless communication memory 12.

In step U3, the wireless memory device 1 determines whether or not the data D2 in the wireless communication memory 12 includes a data item which has not been transmitted. For example, each data item in the wireless communication memory 12 is associated with a transmission flag indicating whether or not transmission has been performed. Thus, the controller 8 of the wireless memory device 1 is capable of determining whether or not a data item which has not been transmitted is included in the data D2 by referring to the transmission flag related to each data item in the wireless communication memory 12 in series.

When a data item which has not been transmitted is included in the data D2, the wireless memory device 1 transmits, to the communication device 3, a terminal device ID, an accessory ID and time data determined as untransmitted data, and a corresponding user ID and password by NFC in step U4. Subsequently, the processing moves to step U9.

When the data item which has not been transmitted is not included in the data D2, the wireless memory device 1 deletes, from the data D2 in the wireless communication memory 12, a terminal device ID, an accessory ID and time data determined as transmitted data in step U5.

When a terminal device ID is related to a plurality of accessory IDs related to a plurality of transmission flags, respectively, and further when all of the transmission flags related to the terminal device ID via the accessory IDs indicate that transmission has been performed, the wireless memory device 1 may delete the terminal device ID from the data D2.

In this manner, a free area may be allocated to the wireless communication memory 12.

In step U6, from the data D1 in the nonvolatile memory 7, the wireless memory device 1 reads a user ID, a password, a terminal device ID, an accessory ID and time data related to a transfer flag indicating that transfer has not been performed.

In step U7, the wireless memory device 1 stores the terminal device ID, the accessory ID and the time data read from the nonvolatile memory 7 in the data D2 in the wireless communication memory 12 in association with a corresponding user ID and password and a transmission flag indicating that transmission has not been performed.

In step U8, the wireless memory device 1 transmits the user ID, the password, the terminal device ID, the accessory ID and the time data stored in the wireless communication memory 12 by NFC.

For example, the communication controller 9 receives a change command for the transmission flag related to the transmitted data or a deletion command for the transmitted data from the communication device 3 after the transmission of step U8 by NFC. The communication controller 9 associates the transmitted accessory ID in the wireless communication memory 12 with a transmission flag indicating that transmission has been performed or deletes the transmitted accessory ID in accordance with the command received from the communication device 3.

For example, the controller 8 receives a change command for the transmission flag related to the transmitted data or a deletion command for the transmitted data from the communication device 3 via the communication controller 9 after the transmission of step U8 by NFC. The controller 8 instructs the communication controller 9 to associate the transmitted accessory ID with a transmission flag indicating that transmission has been performed or delete the transmitted accessory ID in accordance with the received command. In accordance with this instruction, the communication controller 9 associates the transmitted accessory ID in the wireless communication memory 12 with a transmission flag indicating that transmission has been performed, or deletes the transmitted accessory ID.

The communication controller 9 or the controller 8 may update a transmission flag for each data transmission or may update transmission flags equivalent to a plurality of data transmissions in a lump.

When all of data items related to transmission flags indicating that transmission has not been performed in the wireless communication memory 12 have been transmitted, the communication controller 9 or the controller 8 may detect completion of transmission and update the transmission flags or delete the data items.

When power supply is decreased to a predetermined level, the communication controller 9 or the controller 8 may determine that communication between the communication controller 9 and the communication device 3 by NFC is finished, and update a transmission flag or delete data.

Apart from the above, the firmware of the controller 8 or the communication controller 9 conforming to a wireless communication protocol may update a transmission flag in the wireless communication memory 12 or delete data at a set time point.

In step U9, the communication device 3 receives a user ID, a password, a terminal device ID, an accessory ID and time data from the wireless memory device 1 by NFC.

In step U5 described above, the wireless memory device 1 deletes a terminal device ID and an accessory ID determined as transmitted data. However, instead, the controller 8 of the wireless memory device 1 may manage a storage area of a terminal ID and an accessory ID related to a transmission flag indicating that transmission has been performed as an area in which data can be overwritten. Thus, the controller 8 may overwrite the storage area with different data.

In step U8 described above, out of data D2 in the wireless communication memory 12, the wireless memory device 1 may transmit a combination of a user ID and a password related to a transmission flag indicating that transmission has not been performed and a plurality of terminal device IDs, accessory IDs and time data items related to the transmission flag indicating that transmission has not been performed to the communication device 3 by NFC in a lump. In this case, in step U9 described above, the communication device 3 receives the combination of the user ID and the password and the plurality of terminal device IDs, accessory IDs and time data items from the wireless memory device 1 by NFC. In this manner, the communication device 3 is capable of registering a plurality of terminal devices IDs, accessory IDs and time data items with the site of the server device 4 in a lump. Thus, the operation of the user can be reduced.

The user may instruct repetition of processing of FIG. 14. For example, the user operates the communication device 3 to instruct processing for registering another unregistered data item after step U9. In accordance with the instruction, the communication device 3 performs step U1 again.

FIG. 15 is a data structural diagram exemplarily showing a first state before and after transferring data items D11 and D12 in the nonvolatile memory 7 according to the present embodiment. FIG. 15 shows an example in which the number of data items is two. However, the number of data items may be one, three or more.

The data items D11 and D12 are stored in the nonvolatile memory 7. Each of the data items D11 and D12 includes a header, a user ID, a password, a terminal device ID, an accessory ID, time data, a transfer flag and an error correction code.

For example, an error correction code is a code such as a checksum. The controller 8 uses the error correction code for, for example, correcting an error of the related header, related user ID, related password, related terminal device ID, related accessory ID and related time data.

In the data item D11, the transfer flag is "1" indicating that the data item has been transferred. In the data item D12, the transfer flag is "0" indicating that the data item has not been transferred.

After the controller 8 transfers the data item D12 from the nonvolatile memory 7 to the wireless communication memory 12, the controller 8 changes the transfer flag of the data item D12 to "1".

FIG. 16 is a block diagram exemplarily showing a second state before and after transferring data items D13 and D14 in the nonvolatile memory 7 according to the present embodiment. FIG. 16 shows an example in which the number of data items is two. However, the number of data items may be one, three or more.

The data items D13 and D14 are stored in the nonvolatile memory 7. Each of the data items D13 and D14 includes a header, a user ID, a password, a terminal device ID, an accessory ID, time data and an error correction code.

Further, the nonvolatile memory 7 stores a data item F including a transfer flag F1 related to the data item D13 and a transfer flag F2 related to a data item D14.

In the example of FIG. 16, the nonvolatile memory 7 stores the transfer flags F1 and F2 related to the data items D13 and D14 correctively in an area different from the data items D13 and D14.

The transfer flag F1 related to the data item D13 is "1" indicating that the data item has been transferred. The transfer flag F2 related to the data item D14 is "0" indicating that the data item has not been transferred.

After the controller 8 transfers the data item D14 from the nonvolatile memory 7 to the wireless communication memory 12, the controller 8 changes the transfer flag F2 related to the data item D14 to "1".

The same data structures as FIG. 15 and FIG. 16 described above are applicable to the wireless communication memory 12 as well as the nonvolatile memory 7. However, in this case, the transfer flag of data of the nonvolatile memory 7 is replaced by the transmission flag of data of the wireless communication memory 12.

Now, this specification explains the whole operation of the information processing system 100 which has the above structures and performs the above processing.

The user is able to attach various types of accessories 5 to the terminal device 2. Each accessory 5 is assigned an accessory ID for identifying the accessory 5. The terminal device 2 obtains the accessory ID attached to the accessory 5. When the terminal device 2 obtains the accessory ID, a bit code, a barcode or a two-dimensional barcode may be used.

The terminal device 2 communicates with the wireless memory device 1 via a wired interface and transmits a terminal device ID and an accessory ID.

The wireless memory device 1 stores the received terminal device ID and accessory ID in the nonvolatile memory 7. The wireless memory device 1 transfers the terminal device ID and the accessory ID from the nonvolatile memory 7 to the wireless communication memory 12 of the communication controller 9. The wireless communication memory 12 stores the data D2 in which a user ID, a password, a terminal device ID and an accessory ID are associated with each other.

The communication device 3 receives the user ID, the password, the terminal device ID and the accessory ID included in the data D2 stored in the wireless communication memory 12 from the wireless memory device 1 via wireless communication. The communication device 3 logs in to the site provided by the server device 4 with the user ID and the password, and registers the terminal device ID and the accessory ID.

In the present embodiment, the wireless memory device 1 may have an encryption key. The communication device 3 may have a decryption key. Thus, data transferred from the wireless memory device 1 to the communication device 3 may be encrypted. In this manner, the security of communication can be improved.

In the present embodiment explained above, the wireless memory device 1 retains URL information for accessing the server device 4 of a cloud service, login information of the user, the terminal device ID of at least one terminal device 2 used by the user, and the accessory ID of at least one accessory 5 attached by the user to the terminal device 2. The communication device 3 receives the URL information and accesses the server device 4 using the login information. Specifically, the communication device 3 reads the login information from the wireless memory device 1 and transmits the login information to the server device 4 when logging in to the server device 4.

Thus, the user is able to register the terminal device ID and the accessory ID with the site by accessing the site with the URL information and causing the wireless memory device 1 to communicate with the communication device 3 via NFC without executing a login or registration operation. As a result, it is possible to reduce a burden on the user when logging in or registering.

In the present embodiment, the user attaches the wireless memory device 1 to the terminal device 2 such as a toy. In this manner, content data of a toy can be stored in the wireless memory device 1. Further, the toy can cooperate with a cloud service which provides content unique to the toy via the communication device 3. In this manner, a service provided to the user can be improved. A operator of the site is able to unify management regarding which user used which toy in which time by cooperation between the toy and the cloud service. The operator can utilize data to attract more customers and improve marketing.

In the present embodiment, for example, the processing in the communication device 3 such as Steps S1, S2, W2, T9-T11, U1, U9, etc., may be performed by a program loaded to the communication device 3.

Second Embodiment

In the present embodiment, a modification example of the first embodiment is explained.

FIG. 17 is a block diagram exemplarily showing areas of the wireless communication memory 12 of the wireless memory device 1 according to the present embodiment.

The wireless communication memory 12 includes, for example, areas E1 and E2.

The area E1 is ensured based on an NFC data exchange format (NDEF), which is a format conforming to an NFC standard.

Data stored in the area E1 is transmitted from the wireless memory device 1 to the communication device 3 by NFC without particular specification.

Therefore, data to be transmitted to the communication device 3 by NFC may be stored in the area E1.

For example, even in a case where an application program dedicated to data communication between the wireless memory device 1 and the communication device 3 is not installed into the communication device 3, the communication device 3 is capable of receiving information necessary for connection to the site, a user ID, a password, a terminal device ID and an accessory ID by NFC when they are stored in the area E1.

For example, in a case where the application software dedicated to data communication between the wireless memory device 1 and the communication device 3 is installed into the communication device 3, the communication device 3 is capable of receiving the information necessary for connection to the site, the user ID, the password, the terminal device ID and the accessory ID by NFC when they are stored in one of the areas E1 and E2.

As explained above, in the present embodiment, processing related to NFC can be simplified by using an NDEF.

Third Embodiment

In the present embodiment, a modification example of the first and second embodiments is explained. In the present embodiment, mirroring is explained specifically.

As described above, for example, when electric power is supplied to the wireless memory device 1, mirroring is performed. For example, the wireless memory device 1 may perform mirroring when the wireless memory device 1 is electrically connected to the terminal device 2 and the user attaches the accessory 5 to the terminal device 2. Afterward, the wireless memory device 1 may perform mirroring every time the user attaches another accessory 5 to the terminal device 2 in a state where the wireless memory device 1 is electrically connected to the terminal device 2. For example, the wireless memory device 1 may perform mirroring when the terminal device 2 outputs sound corresponding to the accessory 5.

The wireless memory device 1 may communicate with the communication device 3 even in a state where the wireless memory device 1 is not connected to the terminal device 2. Thus, even when electric power is not supplied from the terminal device 2 to the wireless memory device 1, the wireless memory device 1 is capable of performing processing such as mirroring.

In the present embodiment, this specification explains an example in which a buffer memory is used to determine whether or not mirroring should be performed. However, the wireless memory device 1 may perform mirroring in accordance with a command from the communication device 3. The wireless memory device 1 may associate a mirroring flag with each data item. The mirroring flag enables detection of whether or not the data item has been updated. The wireless memory device 1 may perform mirroring for a data item related to a mirroring flag indicating that the data item has been updated.

FIG. 18 is a block diagram exemplarily showing a relationship between the nonvolatile memory 7 and the wireless communication memory 12 according to the present embodiment.

When the controller 8 receives a terminal device ID and an accessory ID from the terminal device 2, the controller 8 includes the received data in a file 71 having a specific extension in the nonvolatile memory 7 via a memory controller 10. The file 71 corresponds to, for example, the data D1 of FIG. 8.

The wireless communication memory 12 includes a mirror area 12A, a mirror buffer area 12B and a file buffer area 12C.

The controller 8 applies mirroring between data of the file 71 and data of the mirror area 12A.

The mirror buffer area 12B stores previous data (pre-update data) in the mirror area 12A.

The file buffer area 12C stores previous data (pre-update data) of the file 71.

The mirror buffer area 12B and the file buffer area 12C are areas which are destinations of mirroring of the file 71 having the specific extension in the nonvolatile memory 7.

The controller 8 ensures uniformity of data D15 between the file 71 in the nonvolatile memory 7 and the mirror area 12A in the wireless communication memory 12 by mirroring. The data D15 includes a header D151, data D152 and an error correction code D153. The data D152 includes, for example, a user ID, a password, a terminal device ID, an accessory ID and time data.

FIG. 19 is a conceptual diagram exemplarily showing mirroring which is performed when data is stored in the wireless communication memory 12 according to the present embodiment.

A user moves the communication device 3 closer to the wireless memory device 1. The mirror area 12A of the wireless communication memory 12 stores data from the communication device 3.

The controller 8 compares the mirror area 12A with the mirror buffer area 12B and determines whether or not there is a difference between them.

When there is no difference between the mirror area 12A and the mirror buffer area 12B, the controller 8 maintains states of the mirror area 12A, the mirror buffer area 12B and the file buffer area 12C as they are.

When there is a difference between the mirror area 12A and the mirror buffer area 12B, the controller 8 copies data in the mirror area 12A to the file 71 in the nonvolatile memory 7 and copies the data in the mirror area 12A to the mirror buffer area 12B.

For example, when the user moves the communication device 3 closer to the wireless memory device 1, the user is able to confirm a version of the current terminal device 2 by the communication device 3. The user is able to easily access the site of the server device 4. The user is able to switch a mode of the terminal device 2. Specifically, the user is able to update a part of the file 71 as the target for mirroring, update the terminal device 2 by using the wireless memory device 1 and change sound to be output in accordance with the accessory 5.

Figure 20:
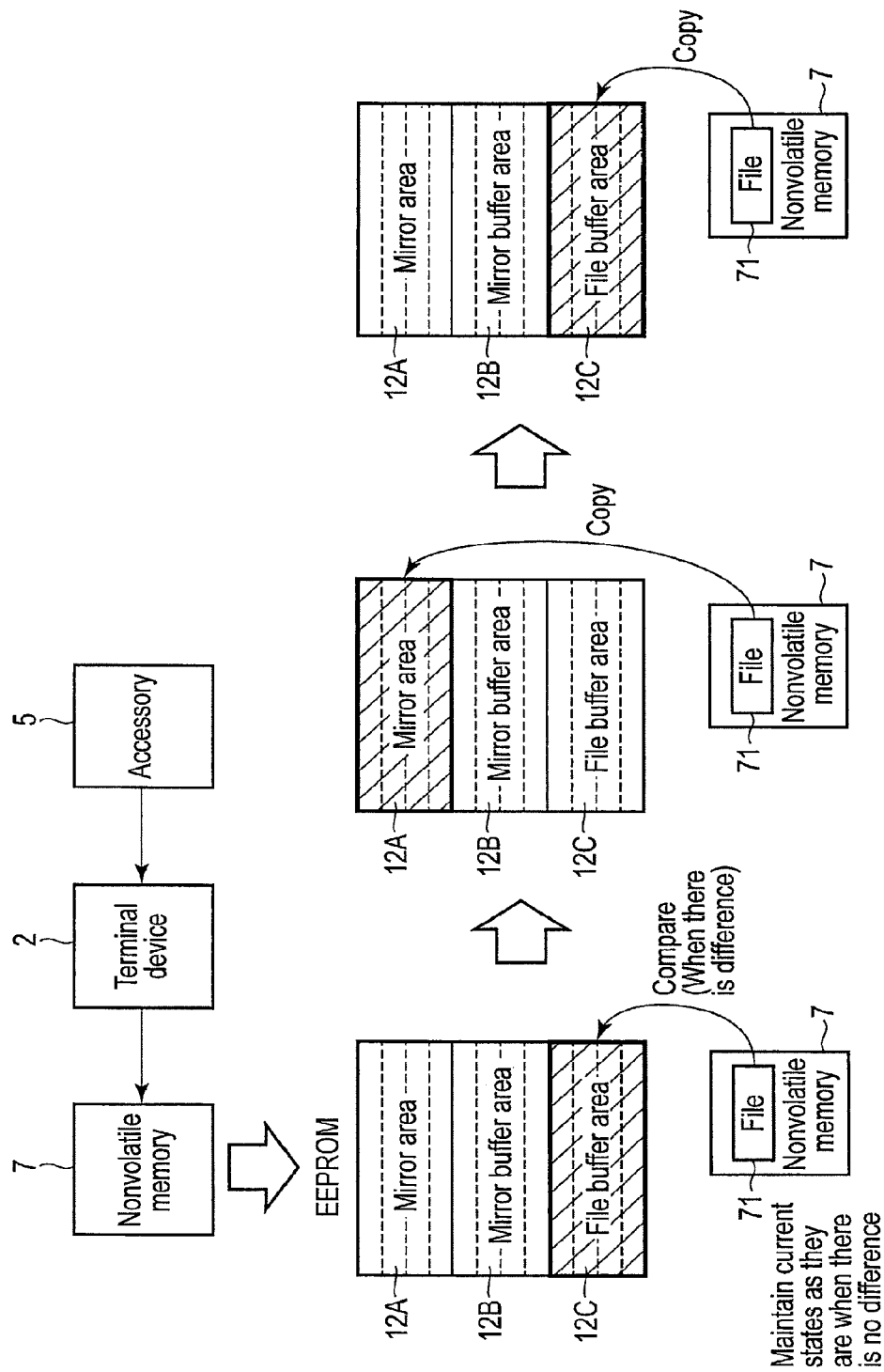
FIG. 20 is a conceptual diagram exemplarily showing mirroring which is performed when data is stored in the nonvolatile memory according to the third embodiment.

FIG. 20 is a conceptual diagram exemplarily showing mirroring which is performed when data is stored in the nonvolatile memory 12 according to the present embodiment.

A user attaches the accessory 5 to the terminal device 2 and inserts the wireless memory device 1 into the slot of the terminal device 2. The controller 8 stores data including a terminal device ID and an accessory ID in the file 71 in the nonvolatile memory 7.

The controller 8 compares data in the file 71 with data in the file buffer area 12C and determines whether or not there is a difference between them.

When there is no difference between the file 71 and the file buffer area 12C, the controller 8 maintains states of the mirror area 12A, the mirror buffer area 12B and the file buffer area 12C as they are.

When there is a difference between the file 71 and the file buffer area 12C, the controller 8 copies the data in the file 71 to the mirror area 12A and copies the data in the file 71 to the file buffer area 12C.

In this manner, the user is able to add data by transferring data obtained by the terminal device 2 to the nonvolatile memory 7 of the wireless memory device 1, the wireless communication memory 12 and the communication device 3.

FIG. 21 is a flowchart exemplarily showing mirroring which is performed by the controller 8 according to the present embodiment.

The controller 8 compares data of the file 71 in the nonvolatile memory 7 with data in the mirror area 12A in step Y1 and determines whether or not there is a difference in step Y2.

When the controller 8 determines that there is no difference between the data in the file 71 in the nonvolatile memory 7 and the data in the mirror area 12A, the processing is terminated.

When the controller 8 determines that there is a difference between the data of the file 71 in the nonvolatile memory 7 and the data in the mirror area 12A, the controller 8 advances the processing to step Y3 to determine whether there is a change in the wireless communication memory 12 or in the file 71 in the nonvolatile memory 7.

Subsequently, the controller 8 compares the data in the file 71 in the nonvolatile memory 7 with data in the file buffer area 12C in step Y3 and determines whether or not there is a difference between them in step Y4.

When the controller 8 determines that there is no difference between the data in the file 71 in the nonvolatile memory 7 and the data in the file buffer area 12C, the controller 8 advances the processing to step Y6.

When the controller 8 determines that there is a difference between the data of the file 71 in the nonvolatile memory 7 and the data in the file buffer area 12C, the controller 8 copies the data in the file 71 in the nonvolatile memory 7 to the mirror area 12A and copies the data in the file 71 in the nonvolatile memory 7 to the file buffer area 12C in step Y5.

Subsequently, the controller 8 compares the data in the mirror area 12A with data in the mirror buffer area 12B in step Y6 and determines whether or not there is a difference between them in step Y7.

When the controller 8 determines that there is no difference between the data in the mirror area 12A and the data in the mirror buffer area 12B, the processing is terminated.

When the controller 8 determines that there is a difference between the data in the mirror area 12A and the data in the mirror buffer area 12B, the controller 8 copies the data of the mirror area 12A to the file 71 in the nonvolatile memory 7 and copies the data in the mirror area 12A to the mirror buffer memory 12B.

In the present embodiment, when data storage in the wireless communication memory 12 is performed at the same time as data storage in the file 71 of the nonvolatile memory 7, firstly, the communication controller 9 performs the processing of NFC.

Subsequently, the memory controller 10 executes file processing to the file 71. Thus, the data in the file 71 is transferred to the wireless communication memory 12 by mirroring.

Fourth Embodiment

In a present embodiment, modification examples of the first to third embodiments are explained. In the present embodiment, mirroring (synchronization) is performed between the nonvolatile memory 7 of the wireless memory device 1 and the wireless communication memory 12. Here, synchronization refers to processing which makes a plurality of data so as to have the same content. In the present embodiment, the case where the controller 8 controls mirroring is explained as an example. However, another controller may controls mirroring in place of the controller 8. For example, the wireless memory device 1 may further comprise a controller for mirroring. Alternatively, a controller in which the controller 8 is combined with the memory controller 10 may control mirroring.

For example, the controller 8 may periodically perform mirroring. The controller 8 may perform mirroring at timing by which data writing from a first external device (or a second host device) to the wireless memory device 1 based on wireless communication is detected. The controller 8 may perform mirroring at timing by which electric power is supplied from a second external device (or a first host device) to the wireless memory device 1. The controller 8 may perform mirroring at timing by which data writing from the second external device to the wireless memory device 1 is detected.

FIG. 22 is a block diagram exemplarily showing the flow of data in an information processing system 101 according to the present embodiment.

The information processing system 101 includes the wireless memory device 1, an electronic device 14 and an information processing device 15. The wireless memory device 1 is attachable to the electronic device 14. The information processing device 15 is wirelessly communicable with the wireless memory device 1.

The electronic device 14 may be the above terminal device 2. Specifically, the electronic device 14 may be a toy, a smartwatch, a game console, a mobile phone (including a smartphone), an information processing device, a computer, a wearable terminal, a digital camera, etc. The electronic device 14 comprises an attachment unit 141 for allowing the wireless memory device 1 to be attached to or detached from the electronic device 14. The user is able to insert the wireless memory device 1 into the attachment unit 141 or detach (draw) the wireless memory device 1 from the attachment unit 141. When the wireless memory device 1 is attached to the attachment unit 141, the electronic device 14 is electrically connected to the wireless memory device 1, and receives or transmits commands, addresses, data, information, instructions, signals, etc., from/to the wireless memory device 1.

The information processing device 15 may be the above communication device 3. Specifically, the information processing device 15 may be a mobile phone, a computer, a game console, a station device, a wearable terminal, etc. The information processing device 15 is capable of receiving or transmitting commands, addresses, data, information, instructions, signals, etc., from/to the wireless memory device 1.

First, a first flow F1 is explained. The first flow F1 shows the electronic device 14 transmits data to the wireless memory device 1, and subsequently, the wireless memory device 1 transmits data to the information processing device 15.

When the wireless memory device 1 is attached to the attachment unit 141 of the electronic device 14, the electronic device 14 supplies electric power to the wireless memory device 1. The electronic device 14 transmits write data and a write command corresponding to the write data to the wireless memory device 1.

The wireless memory device 1 receives the electric power from the electronic device 14 via the connection unit 11. The controller 8 of the wireless memory device 1 receives the write data and the write command from the electronic device 14 via the connection unit 11. The controller 8 stores the write data in the nonvolatile memory 7 via the memory controller 10.

The controller 8 performs mirroring between the nonvolatile memory 7 and the wireless communication memory 12. Specifically, the controller 8 reads data from the nonvolatile memory 7 via the memory controller 10 and stores the read data in the wireless communication memory 12 via the communication controller 9.

When the wireless memory device 1 approaches the information processing device 15, the communication controller 9 reads data from the wireless communication memory 12 and wirelessly transmits the read data to the information processing device 15 via the wireless antenna 6.

Next, a second flow F2 is explained. The second flow F2 shows the information processing device 15 transmits data to the wireless memory device 1, and subsequently, the wireless memory device 1 transmits data to the electronic device 14.

When the wireless memory device 1 approaches the information processing device 15, the information processing device 15 wirelessly transmits write data and a write command corresponding to the write data to the wireless memory device 1.

The communication controller 9 of the wireless memory device 1 wirelessly receives the write data and the write command from the information processing device 15 via the wireless antenna 6. The communication controller 9 stores the received write data in the wireless communication memory 12.

When the wireless memory device 1 is attached to the attachment unit 141 of the electronic device 14, the electronic device 14 supplies electric power to the wireless memory device 1.

The controller 8 performs mirroring between the nonvolatile memory 7 and the wireless communication memory 12. Specifically, the controller 8 reads data from the wireless communication memory 12 via the communication controller 9 and stores the read data in the nonvolatile memory 7 via the memory controller 10.

The electronic device 14 transmits a read command to the wireless memory device 1. The controller 8 of the wireless memory device 1 receives the read command from the electronic device 14 via the connection unit 11. The controller 8 reads data from the nonvolatile memory 7 via the memory controller 10 and transmits the read data to the electronic device 14 via the connection unit 11.

As explained in the first flow F1, even when the communication interface of the electronic device 14 is different from that of the information processing device 15, the data of the electronic device 14 can be transmitted to the information processing device 15 via the wireless memory device 1 by interposing the wireless memory device 1 between the electronic device 14 and the information processing device 15. Further, as shown in the second flow F2, the data of the information processing device 15 can be transmitted to the electronic device 14 via the wireless memory device 1.

Figure 23:
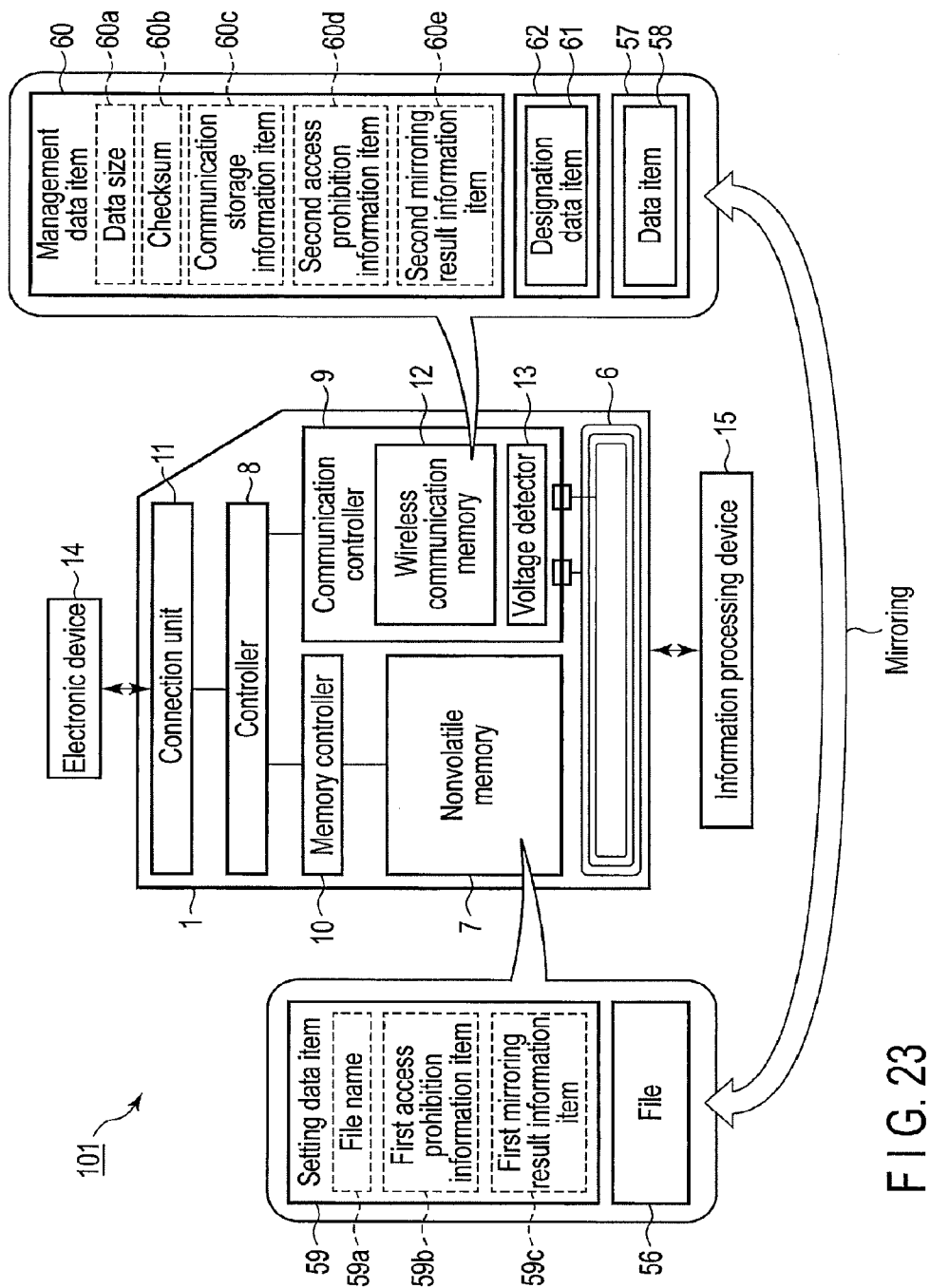
FIG. 23 is a block diagram showing an example of a configuration of a wireless memory device according to the fourth embodiment.

FIG. 23 is a block diagram showing an example of a configuration of the wireless memory device 1 according to the present embodiment.

In the present embodiment, the file or data item to be subjected to mirroring performed by the controller 8 between the memory controller 10 and the communication controller 9 is called the target file or data item for mirroring. In the present embodiment, a file 56 stored in the nonvolatile memory 7 is assumed to be the target for mirroring. Further, a data item 58 stored in a particular or specified address area 57 included in the wireless communication memory 12 is assumed to be the target for mirroring in the wireless communication memory 12.

In the present embodiment, the data item 58 corresponding to the target file 56 for mirroring out of the files stored in the nonvolatile memory 7 is stored in the address area 57 of the wireless communication memory 12. By contrast, the file 56 corresponding to the target data item 58 for mirroring stored in the address area 57 of the wireless communication memory 12 is stored in the nonvolatile memory 7.

However, the data stored in the nonvolatile memory 7 may be mirroring with another data unit other than a file unit. For example, a particular or designated address area included in the nonvolatile memory 7 may be the target for mirroring in the nonvolatile memory 7. The data stored in the wireless communication memory 12 may be mirroring with a data unit such as a file unit.

In FIG. 23, when the file 56 stored in the nonvolatile memory 7 is updated, the data item 58 stored in the address area 57 of the wireless communication memory 12 is updated with the updated file 56. By contrast, when the data item 58 stored in the address area 57 of the wireless communication memory 12 is updated, the file 56 stored in the nonvolatile memory 7 is updated with the updated data item 58.

A setting data item 59 and the target file 56 for mirroring are stored in the nonvolatile memory 7.

The setting data item 59 includes a file name 59*a*, a first access prohibition information item 59*b* and a first mirroring result information item 59*c*.

The file name 59*a* is the file name of the target file 56 for mirroring out of the files stored in the nonvolatile memory 7. The setting data item 59 includes a plurality of file names when a plurality of files are the targets for mirroring in the nonvolatile memory 7. In the present embodiment, the data stored in the nonvolatile memory 7 is subjected to mirroring based on a file unit. Thus, the target for mirroring is designated by the file name 59*a*. However, different data identification information may be used in place of the file name 59*a*. For example, an address area in the nonvolatile memory 7 may be specified as the target for mirroring.

The first access prohibition information item 59*b* is an information item indicating whether or not the access to the nonvolatile memory 7 is prohibited in order to prevent collision of a plurality of accesses to the nonvolatile memory 7. The first access prohibition information item 59*b* is, for example, a flag information item. In the present embodiment, for example, the first access prohibition information item 59*b* is on, when the access to the nonvolatile memory 7 should be prohibited. The first access prohibition information item 59*b* is off, when the access to the nonvolatile memory 7 should be permitted.

The first mirroring result information item 59*c* is an information item indicating which mirroring has been completed for the nonvolatile memory 7, mirroring from the nonvolatile memory 7 (file 56) to the wireless communication memory 12 (data item 58), or mirroring from the wireless communication memory 12 to the nonvolatile memory 7. The first mirroring result information item 59*c* is, for example, a flag information item. In the present embodiment, the first mirroring result information item 59*c* is 1 when mirroring from the nonvolatile memory 7 to the wireless communication memory 12 has been completed. The first mirroring result information item 59*c* is 0 when mirroring from the wireless communication memory 12 to the nonvolatile memory 7 has been completed.

A management data item 60, a designation data item 61 and the target data item 58 for mirroring are stored in the wireless communication memory 12.

The management data item 60 includes a data size 60*a*, a checksum 60*b*, a communication storage information item 60*c*, a second access prohibition information item 60*d* and a second mirroring result information item 60*e*.

The data size 60*a* is the size of the data item 58. When the data item 58 is updated by mirroring, the data size 60*a* is updated to a size corresponding to the updated data item 58 by the controller 8.

The checksum 60*b* is an error-detecting code for the data item 58. When the data item 58 is updated by mirroring, the checksum 60*b* is updated to a checksum 60*b* corresponding to the updated data item 58 by the controller 8.

When the communication controller 9 receives the data item 58 from the information processing device 15 via the wireless antenna 6 and stores the received data item 58 in the wireless communication memory 12, the data size 60*a* and the checksum 60*b* are updated by the communication controller 9.

As the error-detecting code or error-correcting code for the data item 58, an error-detecting code or error-correcting code other than the checksum 60*b*, such as a CRC code, may be used.

The communication storage information item 60*c* is an information item indicating that mirroring from the wireless communication memory 12 to the nonvolatile memory 7 is not performed after the data item 58 is stored in the wireless communication memory 12 by wireless communication from the information processing device 15. The communication storage information item 60*c* is, for example, a flag information item. For example, the communication storage information item 60*c* is on when mirroring from the wireless communication memory 12 to the nonvolatile memory 7 is not performed after the data item 58 is stored in the wireless communication memory 12 by wireless communication from the information processing device 15. In the other cases, the communication storage information item 60*c* is off.

The second access prohibition information item 60*d* is an information item indicating whether or not the access to the wireless communication memory 12 is prohibited in order to prevent collision of a plurality of accesses to the wireless communication memory 12. The second access prohibition information item 60*d* is, for example, a flag information item. In the present embodiment, the second access prohibition information item 60*d* is on, when the access to the wireless communication memory 12 should be prohibited. The second access prohibition information item 60*d* is off, when the access to the wireless communication memory 12 should be permitted.

The second mirroring result information item 60*e* is an information item indicating which mirroring has been completed for the wireless communication memory 12, mirroring from the nonvolatile memory 7 to the wireless communication memory 12, or mirroring from the wireless communication memory 12 to the nonvolatile memory 7. The second mirroring result information item 60*e* is, for example, a flag information item. In the present embodiment, the second mirroring result information item 60*e* is 1 when mirroring from the nonvolatile memory 7 to the wireless communication memory 12 has been completed. The second mirroring result information item 60*e* is 0 when mirroring from the wireless communication memory 12 to the nonvolatile memory 7 has been completed.

The designation data item 61 is a data item which is stored in the wireless communication memory 12 of the communication controller 9 via the wireless antenna 6 by the information processing device 15 when the information processing device 15 intends to rewrite, for example, the file name 59*a* of the setting data item 59 of the nonvolatile memory 7. The designation data item 61 is stored in an address area 62 of the wireless communication memory 12.

In the present embodiment, the controller 8 reads the setting data item 59 from the nonvolatile memory 7 via the memory controller 10 and reads the management data item 60 from the wireless communication memory 12 via the communication controller 9. The controller 8 performs mirroring from the nonvolatile memory 7 to the wireless communication memory 12 or mirroring from the wireless communication memory 12 to the nonvolatile memory 7 based on the read setting data item 59 and management data item 60, and updates the setting data item 59 and the management data item 60.

The controller 8 further reads the designation data item 61 from the wireless communication memory 12 via the communication controller 9. The controller 8 updates the file name 59*a* of the setting data item 59 of the nonvolatile memory 7 with the file name specified by the read designation data item 61 via the memory controller 10. Alternatively, the controller 8 may newly add the file name specified by the read designation data item 61 to the setting data item 59 of the nonvolatile memory 7.

The controller 8 may update the file name 59*a* or newly add the file name to the setting data item 59 when, for example, the file name 59*a* of the setting data item 59 is different from the file name specified by the designation data item 61. Alternatively, the controller 8 may update the file name 59*a* or newly add the file name to the setting data item 59 when, for example, the file name 59*a* is different from the file name specified by the designation data item 61, and further when the length of the file name 59*a* is the same as that of the file name specified by the designation data item 61.

Now, this specification explains an operation which is performed when the electronic device 14 stores (or updates) the file 56 in the nonvolatile memory 7 of the wireless memory device 1.

The electronic device 14 reads the first access prohibition information item 59*b* included in the setting data item 59 from the nonvolatile memory 7 via the memory controller 10, the controller 8 and the connection unit 11.

The electronic device 14 determines whether or not the read first access prohibition information item 59*b* indicates that the access to the nonvolatile memory 7 is prohibited.

When the access to the nonvolatile memory 7 is not prohibited, the electronic device 14 updates the first access prohibition information item 59b of the nonvolatile memory 7 to a state where the access to the nonvolatile memory 7 is prohibited via the connection unit 11, the controller 8 and the memory controller 10. The electronic device 14 stores the file 56 and restores the first access prohibition information item 59b to a state where the access to the nonvolatile memory 7 is not prohibited.

Subsequently, the electronic device 14 reads the first access prohibition information item 59b included in the setting data item 59a from the nonvolatile memory 7 via the memory controller 10, the controller 8 and the connection unit 11.

The electronic device 14 determines whether or not the read first access prohibition information item 59b indicates that the access to the nonvolatile memory 7 is prohibited.

When the access to the nonvolatile memory 7 is not prohibited, the electronic device 14 reads the first mirroring result information item 59c from the nonvolatile memory 7 via the connection unit 11, the controller 8 and the memory controller 10. Based on the first mirroring result information item 59c, the electronic device 14 is capable of recognizing whether the file 56 of the nonvolatile memory 7 is in a state where the file 56 is stored by the electronic device 14 or in a state where mirroring is performed from the data item 58 of the wireless communication memory 12 to the file 56 of the nonvolatile memory 7.

Now, this specification explains an operation which is performed when the information processing device 15 wirelessly receives the data item 58 from the wireless memory device 1.

The information processing device 15 wirelessly receives the second access prohibition information item 60d included in the management data item 60 of the wireless communication memory 12 via the communication controller 9 and the wireless antenna 6.

The information processing device 15 determines whether or not the read second access prohibition information item 60d indicates that the access to the wireless communication memory 12 is prohibited.

When the access to the wireless communication memory 12 is not prohibited, the information processing device 15 updates the second access prohibition information item 60d included in the management data item 60 of the wireless communication memory 12 to a state where the access to the wireless communication memory 12 is prohibited via the wireless antenna 6 and the communication controller 9, using wireless communication. The information processing device 15 wirelessly receives the data item 58 stored in the address area 57 of the wireless communication memory 12 via the communication controller 9 and the wireless antenna 6. Subsequently, the information processing device 15 restores the second access prohibition information item 60d included in the management data item 60 of the wireless communication memory 12 to a state where the access to the wireless communication memory 12 is not prohibited via the wireless antenna 6 and the communication controller 9, using wireless communication.

Hereinafter an operation by which the information processing device 15 stores the data item 58 in the wireless memory device 1 is explained.

The information processing device 15 wirelessly receives the second access prohibition information item 60d included in the management data item 60 of the wireless communication memory 12 via the communication controller 9 and the wireless antenna 6.

The information processing device 15 determines whether or not the read second access prohibition information item 60d indicates that the access to the wireless communication memory 12 is prohibited.

When the access to the wireless communication memory 12 is not prohibited, the information processing device 15 updates the second access prohibition information item 60d included in the management data item 60 of the wireless communication memory 12 to a state where the access to the wireless communication memory 12 is prohibited via the wireless antenna 6 and the communication controller 9, using wireless communication. The information processing device 15 stores the data item 58 in the address area 57 of the wireless communication memory 12 via the wireless antenna 6 and the communication controller 9, and changes the state of the communication storage information item 60c stored in the wireless communication memory 12 to a state where the data item 58 of the wireless communication memory 12 is stored by wireless communication from the information processing device 15. In accordance with the wireless communication, the communication controller 9 updates the data size 60a and the checksum 60b of the wireless communication memory 12 corresponding to the data item 58 stored in the address area 57 of the wireless communication memory 12. The data processing device 15 restores the second access prohibition information item 60d included in the management data item 60 of the wireless communication memory 12 to a state where the access to the wireless communication memory 12 is not prohibited via the wireless antenna 6 and the communication controller 9, using wireless communication.

Subsequently, the information processing device 15 wirelessly receives the second access prohibition information item 60d included in the management data item 60 of the wireless communication memory 12 via the communication controller 9 and the wireless antenna 6.

The information processing device 15 determines whether or not the read second access prohibition information item 60d indicates that the access to the wireless communication memory 12 is prohibited.

When the access to the wireless communication memory 12 is not prohibited, the information processing device 15 wirelessly receives the second mirroring result information item 60e included in the management data item 60 of the wireless communication memory 12 via the communication controller 9 and the wireless antenna 6. The information processing device 15 is capable of recognizing whether the data item 58 of the wireless communication memory 12 is in a state where the data item 58 is stored by wireless communication from the information processing device 15 or in a state where mirroring is performed from the file 56 of the nonvolatile memory 7 to the data item 58 of the wireless communication memory 12.

Hereinafter, the specific control for mirroring by the controller 8 is explained.

FIG. 24 is a flowchart showing an example of processing for mirroring performed by the controller 8 according to the present embodiment.

In step S2401, the controller 8 determines whether it is a timing by which mirroring should be performed or not. For example, the controller 8 determines that mirroring should be performed when the controller 8 detects that the data item 58 is stored in the wireless communication memory 12 of the communication controller 9 via the wireless antenna 6 by wireless communication from the information processing device 15, or when electric power is supplied from the electronic device 14 via the connection unit 11, or when a write command for the file 56 is received from the electronic device 14 via the connection unit 11.

When it is the timing by which mirroring should not be performed, the controller 8 repeats the determination of step S2401.

When it is the timing by which mirroring should be performed, the controller 8 reads the setting data item 59 from the nonvolatile memory 7 via the memory controller 10 and reads the management data item 60 from the wireless communication memory 12 via the communication controller 9 in step S2402.

In step S2403, the controller 8 checks the read setting data item 59 and determines whether or not mirroring should be performed. For example, the controller 8 determines whether or not the following conditions are satisfied. As the first condition, the setting data item 59 should be stored in the nonvolatile memory 7. As the second condition, the file name 59a should be included in the setting data item 59. As the third condition, the file 56 corresponding to the file name 59a should be stored in the nonvolatile memory 7. When all of these conditions are satisfied, the controller 8 determines that mirroring should be performed. When at least one of the conditions is not satisfied, the controller 8 determines that mirroring should not be performed. For example, the controller 8 may add, to the above conditions to perform mirroring, at least one of the following conditions: a condition that the length of the file name 59a of the setting data item 59 is the same as that of the current file name of the file 56; a condition that the file size of the file 56 is the same as the data size of the data item 58; and a condition that the checksum 60b included in the management data item 60 is the same as the checksum calculated from the data item 58.

When mirroring should not be performed, the processing moves to step S2417.

When mirroring should be performed, the controller 8 determines whether or not the communication storage information item 60c of the management data item 60 indicates that mirroring from the wireless communication memory 12 to the nonvolatile memory 7 is not performed after the data item 58 is stored in the wireless communication memory 12 by wireless communication from the information processing device 15, in other words, whether or not the communication storage information item 60c is on, in step S2404.

When the communication storage information item 60c is on, the processing moves to step S2411 in order to perform mirroring from the wireless communication memory 12 to the nonvolatile memory 7.

When the communication storage information item 60c is off, the processing moves to step S2405 in order to perform mirroring from the nonvolatile memory 7 to the wireless communication memory 12.

In the present embodiment, the controller 8 determines which mirroring should be performed, mirroring from the wireless communication memory 12 to the nonvolatile memory 7, or mirroring from the nonvolatile memory 7 to the wireless communication memory 12, based on the communication storage information item 60c. However, for example, the controller 8 may compare the storage time information corresponding to the file 56 with the storage time information corresponding to the data item 58, and rewrite the older one of the file 56 and the data item 58 based on the newer one by mirroring.

In step S2405, the controller 8 determines whether or not the first access prohibition information item 59b and the second access prohibition information item 60d are in a state where the access is not prohibited, in other words, off.

When the first access prohibition information item 59b and the second access prohibition information item 60d are on and indicate that the access is prohibited, the processing moves to step S2404.

When the first access prohibition information item 59b and the second access prohibition information item 60d are off and indicate that the access is permitted, the controller 8 changes the state of the first access prohibition information item 59b and the second access prohibition information item 60d to a state indicating that the access is prohibited, in other words, on, in step S2406.

In step S2407, the controller 8 copies the file 56 of the nonvolatile memory 7 to the data item 58 of the wireless communication memory 12, using the memory controller 10 and the communication controller 9.

In step S2408, the controller 8 calculates the data size 60a and the checksum 60b corresponding to the data item 58 to which the file 56 is copied, and updates the management data item 60 with the calculated data size 60a and checksum 60b via the communication controller 9.

In step S2409, the controller 8 changes the first mirroring result information item 59c and the second mirroring result information item 60e to 1 indicating that mirroring from the nonvolatile memory 7 to the wireless communication memory 12 has been completed, using the memory controller 10 and the communication controller 9.

In step S2410, the controller 8 changes the state of the first access prohibition information item 59b and the second access prohibition information item 60d to a state indicating that the access is permitted, in other words, off, using the memory controller 10 and the communication controller 9.

When the communication storage information item 60c is on as a result of determination in step S2404, the controller 8 determines whether or not the first access prohibition information item 59b and the second access prohibition information item 60d are off in step S2411.

When the first access prohibition information item 59b and the second access prohibition information item 60d are on and indicate that the access is prohibited, the processing moves to step S2404.

When the first access prohibition information item 59b and the second access prohibition information item 60d are off and indicate that the access is permitted, the controller 8 changes the state of the first access prohibition information item 59b and the second access prohibition information item 60d to on in step S2412.

In step S2413, the controller 8 copies the data item 58 of the wireless communication memory 12 to the file 56 of the nonvolatile memory 7, using the memory controller 10 and the communication controller 9.

In step S2414, the controller 8 changes the state of the communication storage information item 60c to off.

In step S2415, the controller 8 changes the first mirroring result information item 59c and the second mirroring result information item 60e to 0 indicating that mirroring from the wireless communication memory 12 to the nonvolatile memory 7 has been completed, using the memory controller 10 and the communication controller 9.

In step S2416, the controller 8 changes the state of the first access prohibition information item 59b and the second access prohibition information item 60d to off, using the memory controller 10 and the communication controller 9.

After step S2410 or step S2416, the controller 8 determines whether or not the processing should be continued, in step S2417.

When the processing should not be continued, the processing is terminated. When the processing should be continued, the processing moves to step S2401.

FIG. 25 is a block diagram showing a first example of mirroring performed by the wireless memory device 1 according to the present embodiment. To simplify the explanation, FIG. 25 and FIG. 26 to FIG. 29 described later show only the relationship between the nonvolatile memory 7 and the wireless communication memory 12.

For example, the capacity of the nonvolatile memory 7 is greater than that of the wireless communication memory 12. The controller 8 performs mirroring between one or more files out of the files and data items stored in the nonvolatile memory 7 and a part of data items stored in the wireless communication memory 12.

In the example of FIG. 25, a file 63, the setting data item 59, a file 64 and a data item 65 are stored in the nonvolatile memory 7.

The wireless communication memory 12 includes a standard format area 66, a system data area 67 and a data area 68.

In the present embodiment, data having a standard format conforming to the wireless communication standard is stored in the standard format area 66. As the standard format, for example, NFC Data Exchange Format (NDEF) is used. The information processing device 15 is capable of automatically receiving data (for example, a message code) stored in the standard format area 66 from the communication controller 9 via the wireless antenna 6 by performing wireless communication conforming to NFC even if the information processing device 15 does not comprise a specific application program.

The system data area 67 is an area which is used when software such as an operating system is executed.

The data area 68 is an area which is used to store, for example, user data.

The setting data item 59 includes one or more file names as the file names of the targets for mirroring. In the example of FIG. 25, the setting data item 59 includes the file name of the file 63 and the file name of the file 64. The target data item for mirroring may be specified by a data ID different from a file name, and may be specified by an address area.

The controller 8 performs mirroring between the file 63 and a data item 66a of the standard format area 66 and mirroring between the file 64 and a data item 68a of the data area 68, using the memory controller 10 and the communication controller 9.

In this manner, since the data item 66a of the standard format area 66 is the target for mirroring, the data item 66a of the standard format area 66 can be rewritten by either the electronic device 14 or the information processing device 15.

When mirroring is performed from the data item 68a of the wireless communication memory 12 to the file 64 of the nonvolatile memory 7, the file 64 of the nonvolatile memory 7 can be updated with the data item 68a wirelessly received from the information processing device 15, such as a log data item or a maintenance data item.

When mirroring is performed from the file 64 of the nonvolatile memory 7 to the data item 68a of the wireless communication memory 12, the data item 68a corresponding to the file 64 written from the electronic device 14 can be wirelessly obtained by the information processing device 15.

FIG. 26 is a block diagram showing a second example of mirroring performed by the wireless memory device 1 according to the present embodiment. In the example of FIG. 26, the controller 8 extracts a particular data item or a data item specified by an external device (for example, the electronic device 14 or the information processing device 15) from the data items stored in the nonvolatile memory 7. The controller 8 performs processing such that the file 64 including the extracted data item has the same content as the data item 68a of the wireless communication memory 12.

The controller 8 receives the data item 65 having a large data size, such as a log data item, from the electronic device 14 via the connection unit 11, and stores the received data item 65 in the nonvolatile memory 7 via the memory controller 10.

In the present embodiment, the setting data item 59 includes information indicating that an error log data item or a specific data item such as an abnormal value should be extracted from the data item 65 and be stored in the file 64, and information to specify the file 64 as the target for mirroring.

The controller 8 extracts the data item specified by the setting data item 59 from the data item 65 of the nonvolatile memory 7, using the memory controller 10, and stores the extracted data item in the file 64 specified by the setting data item 59. The controller 8 stores the data item 68a corresponding to the file 64 specified by the setting data item 59 in the data area 68 of the wireless communication memory 12, using the memory controller 10 and the communication controller 9. The communication controller 9 reads the data item 68a of the wireless communication memory 12 and wirelessly transmits the read data item 68a to the information processing device 15 via the wireless antenna 6.

In the example of FIG. 26, the target data item for mirroring can be specified by the electronic device 14.

The controller 8 is capable of extracting a specific data item from the data items stored in the nonvolatile memory 7 via the memory controller 10, and storing the extracted data item in the file 64. The controller 8 is capable of copying the file 64 including the extracted data item to the data item 68a of the wireless communication memory 12, using the memory controller 10 and the communication controller 9. The setting data item 59 includes information indicating that a data item should be extracted and stored in the file 64, and information to specify the file 64 to which mirroring is applied by the controller 8. The controller 8 may receive the setting data item 59 including the above information from the electronic device 14 via the connection unit 11 and store it in the nonvolatile memory 7 via the memory controller 10. The communication controller 9 may wirelessly receive a new setting data item from the information processing device 15 via the wireless antenna 6 and store it in the data item 66a or the data item 68a of the wireless communication memory 12. The controller 8 may copy the data item 66a or the data item 68a to the file 63 or the file 64 of the nonvolatile memory 7, using the communication controller 9 and the memory controller 10. The controller 8 may reflect the new setting data item included in the file 63 or the file 64 in the setting data item 59 of the nonvolatile memory 7.

FIG. 27 is a block diagram showing a third example of mirroring performed by the wireless memory device 1 according to the present embodiment.

The controller 8 receives the setting data item 59 from the electronic device 14 via the connection unit 11 and stores the received setting data item 59 in the nonvolatile memory 7 via the memory controller 10.

The setting data item 59 includes, for example, information to specify the file 63, the file 64 and a file 69 as the targets for mirroring, and information to specify the standard format area 66, the data area 68 and a data area 70 of the wireless communication memory 12 as the targets for mirroring.

The standard format area 66, the data area 68 and the data area 70 are specified by, for example, address information of the wireless communication memory 12. Specifically, the standard format area 66, the data area 68 and the data area 70 are specified by, for example, memory blocks, which are the unit for erasing.

The setting data item 59 specifies which data item should be extracted to structure the file 64 from the data items stored in the nonvolatile memory 7, and further specifies which data item should be extracted to structure the file 69 from the data items stored in the nonvolatile memory 7.

The controller 8 reads the setting data item 59, structures the files 64 and 69 based on the setting data item 59 and stores the structured files 64 and 69 in the nonvolatile memory 7, using the memory controller 10. Specifically, for example, the controller 8 may search the nonvolatile memory 7 and store the searched data item in one of the target files 63, 64 and 69 for mirroring, using the memory controller 10. In this case, the search conditions may be included in the setting data item 59.

The controller 8 stores the data items 66a, 68a and 70a corresponding to the files 63, 64 and 69 specified by the setting data item 59 in the standard format area 66 and the data areas 68 and 70 of the wireless communication memory 12 specified by the setting data item 59, using the memory controller 10 and the communication controller 9.

The information processing device 15 wirelessly receives the data items 66a, 68a and 70a stored in the standard format area 66 and the data areas 68 and 70 of the wireless communication memory 12 via the communication controller 9 and the wireless antenna 6.

The files 64 and 69 may not be structured by the controller 8 and may be stored from the electronic device 14 via the connection unit 11, the controller 8 and the memory controller 10.

In the example of FIG. 27, the target data item for mirroring can be specified by the electronic device 14.

The setting data item 59 is capable of specifying the files 63, 64 and 69 as the targets for mirroring on the nonvolatile memory 7 side, and the standard format area 66 and the data areas 68 and 70 as the targets for mirroring on the wireless communication memory 12 side. Thus, it is possible to freely set the target data items for mirroring, and the number of data items as the targets for mirroring.

FIG. 28 is a block diagram showing a fourth example of mirroring performed by the wireless memory device 1 according to the present embodiment.

The wireless communication memory 12 includes a designation area 71.

The information processing device 15 wirelessly transmits a designation data item 71a to the wireless memory device 1.

The communication controller 9 receives the designation data item 71a from the information processing device 15 via the wireless antenna 6 and stores the received designation data item 71a in the designation area 71 of the wireless communication memory 12.

The designation data item 71a specifies that the data item 65 or the data item extracted from the data item 65 should be included in the target file 64 for mirroring.

The controller 8 reads the designation data item 71a of the wireless communication memory 12 via the communication controller 9. The controller 8 puts, into the target file 64 for mirroring, the data item 65 or the data item extracted from the data item 65 stored in the nonvolatile memory 7 and specified by the designation data item 71a via the memory controller 10.

The controller 8 stores the data item 68a corresponding to the file 64 of the nonvolatile memory 7 in the data area 68 of the wireless communication memory 12 by mirroring, using the memory controller 10 and the communication controller 9.

In the example of FIG. 28, the target data for mirroring can be specified by the information processing device 15.

FIG. 29 is a block diagram showing a fifth example of mirroring performed by the wireless memory device 1 according to the present embodiment.

Data items 651 to 65n corresponding to unique data IDs, respectively, are stored in the nonvolatile memory 7.

The communication controller 9 receives the designation data item 71a from the information processing device 15 via the wireless antenna 6 and stores the received designation data item 71a in the designation area 71 of the wireless communication memory 12.

The designation data item 71a specifies that the data item 652 corresponding to a specific data ID should be included in the target file 64 for mirroring. The designation data item 71a may specify an ID different from a data ID, such as a user ID, a data item name or a file name.

The controller 8 reads the designation data item 71a of the wireless communication memory 12 via the communication controller 9. The controller 8 puts, into the target file 64 for mirroring, the data item 652 stored in the nonvolatile memory 7 and corresponding to the data ID specified by the designation data item 71a via the memory controller 10.

The controller 8 stores the data item 68a corresponding to the file 64 of the nonvolatile memory 7 in the data area 68 of the wireless communication memory 12 by mirroring, using the memory controller 10 and the communication controller 9.

In the example of FIG. 29, the target data item for mirroring can be specified by the information processing device 15.

For example, the data items 651 to 65n indicate the coupon information of n users. In this case, the coupon information of a specific user can be wirelessly transferred from the wireless memory device 1 to the information processing device 15 when the designation data item 71a stored in the wireless communication memory 12 specifies the coupon information of the specific user.

In the present embodiment explained above, the wireless memory device 1 comprises the nonvolatile memory 7 and the wireless communication memory 12. When electric power is supplied from the electronic device 14 to the wireless memory device 1, the wireless memory device 1 performs data mirroring between the nonvolatile memory 7 and the wireless communication memory 12. In this manner, data can be transferred between the electronic device 14 and the information processing device 15. For example, the information processing device 15 is capable of accessing the data item 58 corresponding to the file 56 of the nonvolatile memory 7. The electronic device 14 is capable of updating the data item 58 of the wireless communication memory 12. The wireless memory device 1 may be used for, for example, the maintenance of industrial devices, health appliances, the management of coupon information for sales promotion or the management of smart-posters.

In the present embodiment, the user is able to easily confirm the data stored in the nonvolatile memory 7 of the wireless memory device 1. The user is also able to easily update the data stored in the wireless communication memory 12.

In the present embodiment, the target file 56 for mirroring can be specified when the electronic device 14 rewrites the file name 59a of the setting data item 59 of the nonvolatile memory 7. Further, the target file 56 for mirroring can be specified when the information processing device 15 rewrites the designation data item 61 of the wireless communication memory 12 by wireless communication and the controller 8 rewrites the file name 59a of the nonvolatile memory 7 in accordance with the designation data item 61.

In the present embodiment, the first access prohibition information item 59b and the second access prohibition information item 60d manage whether or not the access to the nonvolatile memory 7 and the access to the wireless communication memory 12 are permitted. Thus, in the present embodiment, it is possible to prevent destruction of the file 56 and the data item 58 even when the storage of the file 56 in the wireless memory device 1 from the electronic device 14 is performed at the same time as the storage of the data item 58 in the wireless memory device 1 from the information processing device 15 by wireless communication.

In the present embodiment, a plurality of files or data items can be the targets for mirroring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a nonvolatile memory;
   a first controller which controls the nonvolatile memory;
   a wireless antenna configured to generate electric power based on a radio wave from a first external device;
   a memory which is operable based on the generated electric power;
   a voltage detector which detects a voltage supplied from the wireless antenna;
   a second controller which is operable based on the electric power and performs communication using the wireless antenna when the voltage detector detects a specified voltage; and
   a third controller which controls data copy or data transfer between the nonvolatile memory and the memory,
   wherein
   the third controller receives, from a second external device, identification information including at least one of first identification information indicating the second external device and second identification information indicating an article used in the second external device,
   the third controller stores the identification information in the memory, and
   the second controller transmits login information and the identification information stored in the memory to the first external device via the wireless antenna.

2. The memory device of claim 1, further comprising:
   a connection unit which is electrically-connectable to the second external device,
   wherein
   the nonvolatile memory operates based on electric power supplied from the second external device via the connection unit,
   the first controller operates based on the electric power supplied from the second external device via the connection unit, and
   the third controller receives the identification information from the second external device via the connection unit.

3. The memory device of claim 1, wherein
the third controller stores the identification information in the nonvolatile memory and stores the identification information stored in the nonvolatile memory in the memory.

4. The memory device of claim 3, wherein
the third controller is supplied the electric power from the second external device, and performs, when first data has been stored or updated in one of the nonvolatile memory and the memory, mirroring to store or update second data stored in the other memory of the nonvolatile memory and the memory with a same content as the first data, the mirroring performed when the article is attached to the second external device.

5. The memory device of claim 3, wherein
the memory comprises a first area for storing data identical to data in the nonvolatile memory, a second area for storing pre-update data in the first area, and a third area for storing pre-update data in the nonvolatile memory,
the third controller stores, in the nonvolatile memory, the identification information received from the second external device, and
when first data in the nonvolatile memory is different from second data in the third area, the third controller copies the first data in the nonvolatile memory to the first area and copies the first data in the nonvolatile memory to the third area.

6. The memory device of claim 5, wherein
the second controller receives third data from the first external device via the wireless antenna and stores the third data in the first area, and
when fourth data in the first area is different from fifth data in the second area, the third controller copies the fourth data in the first area to the nonvolatile memory and copies the fourth data in the first area to the second area.

7. The memory device of claim 3, wherein
the third controller manages flag information indicating whether the identification information stored in the nonvolatile memory is transferred to the memory in association with the identification information, and
the third controller selects, as a copy or transfer target, information having the flag information indicating that transfer has not been performed from the identification information.

8. The memory device of claim 3, wherein
the third controller manages flag information indicating whether the identification information stored in the memory is transmitted to the first external device in association with the identification information, and
the third controller selects, as a transmission target, information having the flag information indicating that transmission has not been performed from the identification information.

9. The memory device of claim 1, wherein
the third controller is operable based on the generated electric power.

10. The memory device of claim 1, wherein
the memory device is a SD memory card.

11. The memory device of claim 1, wherein
the third controller compresses data to be stored in the memory and stores the compressed data in the memory, and
the third controller reads the compressed data from the memory via the second controller, decompresses the compressed data read from the memory, and outputs the decompressed data to the second external device or stores the decompressed data in the nonvolatile memory via the first controller.

12. The memory device of claim 1, wherein
the communication is Near Field Communication (NFC),
at least a part of the memory is a memory area corresponded to an NFC data exchange format (NDEF), and
the memory area stores data for the communication.

13. The memory device of claim 1, wherein
the memory includes a secret area, and
the login information is stored in the secret area.

14. An information processing system comprising:
the memory device of claim 1;
the first external device;
the second external device; and
a server device communicably connected to the first external device, wherein
the second external device obtains the identification information including the second identification information attached to the article, and transmits the identification information to the memory device,
the first external device receives the login information and the identification information from the memory device, and transmits the login information and the identification information received from the memory device to the server device, and
the server device receives the login information and the identification information from the first external device, performs login processing using the login information received from the first external device, and performs processing for registering the identification information.

15. The information processing system of claim 14, wherein
information necessary for connection to the server device is stored in the storage device or the first external device.

16. A non-transitory computer readable recording medium to store a program loaded to the first external device communicably connected to the memory device of claim 1, the program causing the first external device to perform:
processing which instructs the memory device to store the login information using the communication;
processing which instructs the memory device to transmit identification information for registration using the communication;
processing which receives the login information and the identification information from the memory device using the communication; and
processing which performs logging in to a service site of an eternal server device using the login information to store the identification information in the eternal server device.

17. A memory device comprising:
a connection unit electrically connectable to a first host device;
a nonvolatile memory which is operable based on electric power supplied from the first host device via the connection unit;
a first controller which is operable based on the electric power supplied from the first host device via the connection unit and controls the nonvolatile memory;
a wireless antenna configured to generate electric power based on a radio wave from a second host device;
a memory which is operable based on the electric power generated by the wireless antenna;
a second controller which is operable based on the electric power generated by the wireless antenna, and performs communication using the wireless antenna; and
a third controller which extract a first data which is specified or a first data designated by an external device, from a plurality of data stored in the nonvolatile memory, and performs synchronization between the first data and a second data stored in the memory.

18. The memory device of claim 17, wherein
data identification information indicating the first data to be subjected to synchronization performed is stored in the nonvolatile memory, and
the third controller performs the synchronization between the first data indicated by the data identification information stored in the nonvolatile memory, and the second data stored in an area of the memory which is specified or an area of the memory designated by the external device or another external device.

19. The memory device of claim 17, wherein
the memory includes a standard format area in which the second data having a standard format conforming to a standard of the communication is stored, and
the third controller performs the synchronization between the first data stored in the nonvolatile memory and the second data stored in the standard format area.

20. The memory device of claim 17, wherein
the first controller is incorporated into the third controller.

* * * * *